(12) United States Patent
Tsurumi et al.

(10) Patent No.: US 9,842,570 B2
(45) Date of Patent: Dec. 12, 2017

(54) DISPLAY DEVICE AND METHOD, AND PROGRAM

(75) Inventors: Shingo Tsurumi, Tokyo (JP); Masaya Igarashi, Tokyo (JP); Noriyuki Yamashita, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 193 days.

(21) Appl. No.: 14/110,486

(22) PCT Filed: May 17, 2012

(86) PCT No.: PCT/JP2012/062637
§ 371 (c)(1),
(2), (4) Date: Oct. 8, 2013

(87) PCT Pub. No.: WO2012/161076
PCT Pub. Date: Nov. 29, 2012

(65) Prior Publication Data
US 2014/0028670 A1   Jan. 30, 2014

(30) Foreign Application Priority Data

May 26, 2011   (JP) ................... 2011-117650
Mar. 14, 2012   (JP) ................... 2012-056700

(51) Int. Cl.
*G09G 5/14*   (2006.01)
*H04N 13/04*   (2006.01)
*G09G 3/00*   (2006.01)

(52) U.S. Cl.
CPC ............... *G09G 5/14* (2013.01); *G09G 3/003* (2013.01); *H04N 13/0409* (2013.01);
(Continued)

(58) Field of Classification Search
USPC ......................................................... 345/419
See application file for complete search history.

(56) References Cited

U.S. PATENT DOCUMENTS 8,749,722 B2 *   6/2014   Uehara ................ G02B 3/0025
349/112
9,124,885 B2 *   9/2015   Bennett .................... G06F 3/14
(Continued)

FOREIGN PATENT DOCUMENTS

CN   101394572 A   3/2009
DE   102004059729 B3   4/2006
(Continued)

OTHER PUBLICATIONS

Hill et al. "3D Liquid Crystal Displays and Their Applications". IEEE 2006.*

(Continued)

*Primary Examiner* — Kimbinh T Nguyen
(74) *Attorney, Agent, or Firm* — Paratus Law Group, PLLC

(57) ABSTRACT

The present technique relates to a display device and method, and a program for presenting high-quality stereoscopic images in a simpler manner.
A display unit is a four-viewpoint display device having a parallax barrier. On the display unit, block regions that are formed with pixels of channels CH0 through CH3 aligned in the parallax direction are aligned in the parallax direction. An allocation control unit allocates a parallax image for the left eye or a parallax image for the right eye to the pixels of each channel in block regions, in accordance with the viewpoint position of the user. For example, the same parallax image is allocated to pixels of two different channels adjacent to each other in the parallax direction. A generating unit generates a combined image by combining the parallax image for the right eye and the parallax image for the left eye in accordance with the allocation performed by the allocation control unit, and causes the display unit to
(Continued)

stereoscopically display the combined image. The present invention can be applied to display devices.

15 Claims, 24 Drawing Sheets

(52) U.S. Cl.
CPC . *H04N 13/0475* (2013.01); *G09G 2320/0209* (2013.01); *G09G 2354/00* (2013.01)

(56) References Cited

U.S. PATENT DOCUMENTS

| | | |
|---|---|---|
| 2003/0048351 A1 | 3/2003 | Ohkubo |
| 2005/0105179 A1* | 5/2005 | Taira .................. H04N 13/0404 359/463 |
| 2006/0215018 A1 | 9/2006 | Fukushima et al. |
| 2009/0123030 A1 | 5/2009 | De La Barre et al. |
| 2009/0278936 A1 | 11/2009 | Pastoor et al. |
| 2010/0110068 A1 | 5/2010 | Yamauchi et al. |
| 2011/0063421 A1 | 3/2011 | Kubota |

FOREIGN PATENT DOCUMENTS

| | | |
|---|---|---|
| JP | 09-050019 | 2/1997 |
| JP | 2008-090617 | 4/2008 |
| JP | 2009-077234 | 4/2009 |
| JP | 2011-064894 | 3/2011 |
| JP | 2011-081630 | 4/2011 |
| WO | WO98/27451 | 6/1998 |
| WO | WO2009/062752 A1 | 5/2009 |
| WO | WO2009/119278 A1 | 10/2009 |

OTHER PUBLICATIONS

Oct. 27, 2016, JP communication issued for related JP application No. 2012-056700.
Nov. 10, 2014, European Search Report issued for related EP application No. 12789096.0.
Nov. 1, 2016, JP communication issued for related JP application No. 2012-056700.
Sep. 8, 2015, JP communication issued for related JP application No. 2012-056700.
Jul. 13, 2015, CN communication issued for related CN application No. 201280024287.0.
Apr. 8, 2015, CN communication issued for related CN application No. 201280024287.0.

\* cited by examiner

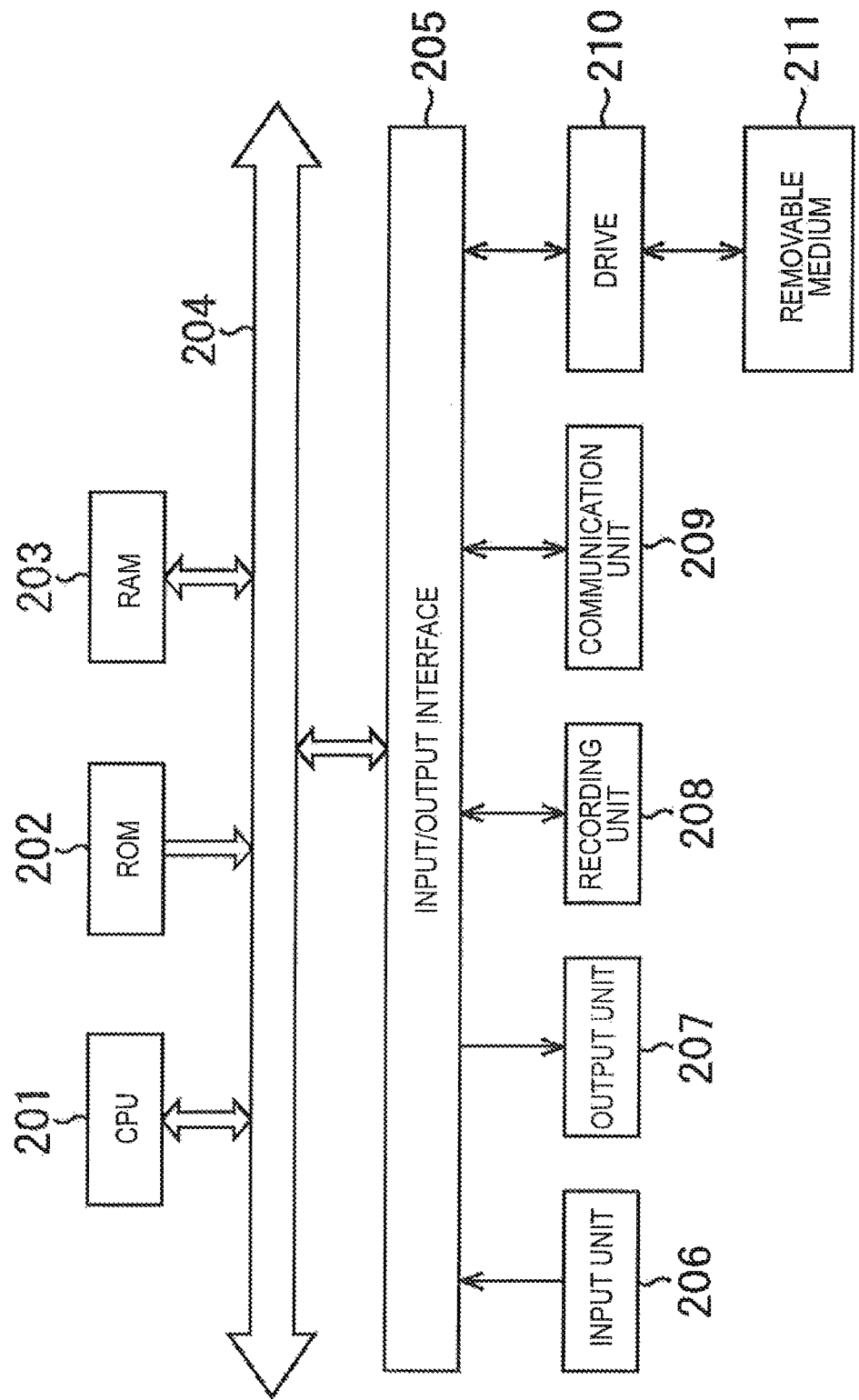

DISPLAY DEVICE AND METHOD, AND PROGRAM

CROSS REFERENCE TO PRIOR APPLICATION

This application is a National Stage Patent Application of PCT International Patent Application No. PCT/JP2012/062637 (filed on May 17, 2012) under 35 U.S.C. §371, which claims priority to Japanese Patent Application Nos. JP2011-117650 (filed on May 26, 2011) and JP2012-056700 (filed on Mar. 14, 2012) which are all hereby incorporated by reference in their entirety.

TECHNICAL FIELD

The present technique relates to display devices and methods, and programs, and more particularly, to a display device and method, and a program for stereoscopically displaying an image by a naked-eye method using a parallax separating unit such as a parallax barrier.

BACKGROUND ART

Examples of known methods for displaying stereoscopic images include glasses methods using glasses for stereoscopic viewing, and naked-eye methods for realizing stereoscopic viewing with the naked eye without glasses specially designed for stereoscopic viewing.

A typical one of the glasses methods is a shutter glasses method using shutter glasses that have a shutter for the left eye and a shutter for the right eye. By the shutter glasses method, a parallax image for the left eye and a parallax image for the right eye are alternately displayed on a two-dimensional display panel at a high speed in a frame sequential manner. As the shutter for the left eye and the shutter for the right eye are alternately closed in synchronization with displaying of each of the parallax images, only the parallax image for the left eye enters the left eye of the viewer, and only the parallax image for the right eye enters the right eye of the viewer. Accordingly, images can be stereoscopically viewed.

Meanwhile, typical naked-eye methods include a parallax barrier method and a lenticular method. In the case of the parallax barrier method or the lenticular method, parallax images for stereoscopic viewing (a parallax image for the right eye and a parallax image for the left eye in the case of two-viewpoint displaying) are spatially divided and are displayed on a two-dimensional display panel, and the parallax images are subjected to parallax separation in the horizontal direction by a parallax separating unit. In this manner, stereoscopic viewing is realized. By the parallax barrier method, a parallax barrier having slit-like openings as the parallax separating unit is used at this point. By the lenticular method, a lenticular lens having cylindrical split lenses arranged in parallel is used as the parallax separating unit.

Also, a device has been suggested as a display device using a naked-eye method in which the design proper viewing distance can be shortened by reducing the distance between the image forming surface of the liquid crystal panel and the parallax barrier (see Patent Document 1, for example).

CITATION LIST

Patent Document

Patent Document 1: JP 9-50019 A

SUMMARY OF THE INVENTION

Problems to be Solved by the Invention

By the naked-eye method using a parallax separating unit, however, crosstalk easily occurs when the viewpoint position of the user changes, and the right and left parallax images are viewed with an eye of the user. As a result, high-quality stereoscopic images cannot be displayed in a stable manner.

The present technique has been developed in view of those circumstances, and is to present high-quality stereoscopic images in a simpler manner.

Solutions to Problems

A display device of one aspect of the present technique includes: a display unit that has block regions each formed with pixels of three or more channels; a separating unit that separates an image displayed on pixels of the respective channels in the block regions; an allocation control unit that allocates one of parallax images to pixels of the respective channels in the block regions in accordance with a viewpoint position of a user viewing the display unit, one of the parallax images being displayed in a first region that is formed with pixels adjacent to one another in the block regions and is formed with pixels of two or more different channels, another one of the parallax images having a parallax with respect to the one of the parallax images being displayed in a second region different from the first region in the block regions; and a generating unit that generates a combined image by combining the parallax images in accordance with the allocation performed by the allocation control unit.

The parallax images may be a parallax image for the right eye and a parallax image for the left eye.

When the user views the display unit from a predetermined viewpoint position, pixels of the same channel in the respective block regions may be viewed.

The allocation control unit may include: a viewed position calculating unit that determines a viewed position in a viewed pixel to be viewed by the user in each of the block regions based on the viewpoint position; and a boundary position calculating unit that calculates a boundary position that is the position of the block region in which the viewed position is substantially the center of the viewed pixel, and allocates the same one of the parallax images to pixels of the same channel in each of the block regions located between the boundary position and another boundary position closest to the boundary position.

In the block regions located between the boundary position and the other boundary position, the boundary position calculating unit may allocate the same one of the parallax images to pixels of the same channel as the channel of the viewed pixel in the block region located in the boundary position and the channel of the viewed pixel in the block region located in the other boundary position.

The boundary position calculating unit may set an eventual boundary position that is the intermediate position between the boundary position calculated based on the right eye of the user and the boundary position calculated based on the left eye of the user.

The allocation control unit may further include a blend ratio calculating unit that calculates a blend ratio for the respective pixels to be viewed with the right and left eyes of the user in a subject region between the boundary position calculated based on the right eye of the user and the boundary position calculated based on the left eye of the user, the blend ratio being calculated based on the positions of the pixels in the subject region. The generating unit may generate the pixels of the combined image to be displayed on the pixels to be viewed with the right and left eyes in the subject region, by blending the parallax image for the right eye and the parallax image for the left eye at the blend ratio.

When the viewpoint position is located outside a predetermined region, the allocation control unit may cause the display unit to display one of the parallax image for the right eye and the parallax image for the left eye.

A display method or a program of the one aspect of the present technique includes the steps of: allocating one of parallax images to pixels of each channel in block regions in accordance with a viewpoint position of a user viewing a display unit, one of the parallax images being displayed in a first region that is formed with pixels adjacent to one another in the block regions and is formed with pixels of two or more different channels, another one of the parallax images having a parallax with respect to the one of the parallax images being displayed in a second region different from the first region in the block regions; and generating a combined image by combining the parallax images in accordance with the allocation.

In the one aspect of the present technique, one of parallax images is allocated to pixels of each channel in block regions in accordance with a viewpoint position of a user viewing a display unit, so that one of the parallax images is displayed in a first region that is formed with pixels adjacent to one another in the block regions and is formed with pixels of two or more different channels, and another one of the parallax images having a parallax with respect to the one of the parallax images is displayed in a second region different from the first region in the block regions. A combined image is generated by combining the parallax images in accordance with the allocation.

Effects of the Invention

According to the one aspect of the present technique, high-quality stereoscopic images can be presented in a simpler manner.

BRIEF DESCRIPTION OF DRAWINGS

FIG. 24 is a diagram showing an example structure of a computer.

MODES FOR CARRYING OUT THE INVENTION

The following is a description of embodiments to which the present technique is applied, with reference to the drawings.

First Embodiment

[Example Structure of a Display Device]

Figure 1:
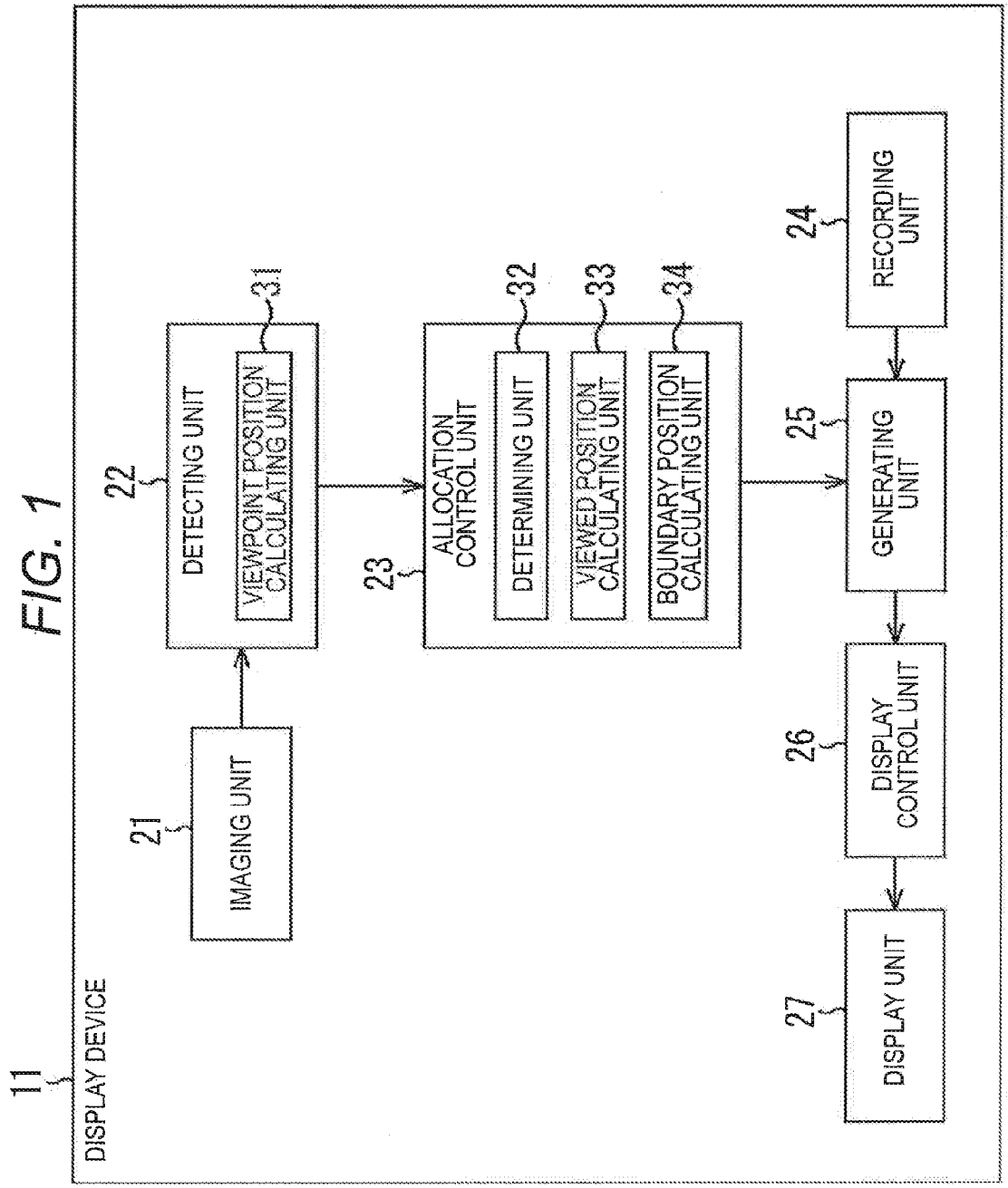
FIG. 1 is a diagram showing an example structure of an embodiment of a display device.

FIG. 1 is a diagram showing an example structure of an embodiment of a display device to which the present technique is applied.

This display device 11 is a display device that stereoscopically displays an object by using parallax images of viewpoints. The display device 11 includes an imaging unit 21, a detecting unit 22, an allocation control unit 23, a recording unit 24, a generating unit 25, a display control unit 26, and a display unit 27.

The imaging unit 21 captures an image of a user located around the display device 11, or an image of a user viewing the image displayed on the display unit 27 from in front of the display unit 27 (the image will be hereinafter referred to as the peripheral image), for example, and supplies the peripheral image to the detecting unit 22.

The detecting unit 22 detects the eyes of the user from the peripheral image supplied from the imaging unit 21, and supplies the detection result to the allocation control unit 23. Also, the detecting unit 22 includes a viewpoint position calculating unit 31, and the viewpoint position calculating unit 31 calculates the position of a viewpoint of the user with respect to the display unit 27 based on the peripheral image, and supplies the calculation result to the allocation control unit 23.

Based on the detection result and the position of the user's viewpoint supplied from the detecting unit 22, the allocation control unit 23 allocates parallax images to respective regions on the display surface of the display unit 27. The allocation control unit 23 includes a determining unit 32, a viewed position calculating unit 33, and a boundary position calculating unit 34.

Based on the viewpoint, position supplied from the detecting unit 22, the determining unit 32 determines whether stereoscopic displaying (3D displaying) of the object is possible with parallax images. The allocation control unit 23 controls image generation at the generating unit 25 in accordance with the determination result.

Based on the viewpoint position supplied from the detecting unit 22, the viewed position calculating unit 33 calculates a viewed position that is the position in each pixel being viewed by the user on the display surface of the display unit 27. Based on the viewed position, the boundary position calculating unit 34 allocates parallax images to the respective regions on the display surface of the display unit 27.

The recording unit 24 records parallax images that constitute a stereoscopic image, and supplies the parallax images to the generating unit 25 where necessary. Under the control of the allocation control unit 23, the generating unit 25 generates a combined image formed by spatially dividing the parallax images from the recording unit 24 and combining the spatially-divided images, and supplies the combined image to the display control unit 26. Under the control of the allocation control unit 23, the generating unit 25 also supplies one of the parallax images from the recording unit 24 directly to the display control unit 26.

The display control unit 26 supplies the combined image from the generating unit 25 to the display unit 27, and causes the display unit 27 to display the combined image. By doing so, the display control unit 26 stereoscopically displays the object in the parallax images, and causes the display unit 27 to receive and display the parallax images from the generating unit 25. The display unit 27 is formed with a liquid crystal display panel or the like that can display a stereoscopic image by a naked-eye method, and displays the combined image and the parallax images supplied from the display control unit 26.

[Example Structure of the Display Unit]

Figure 2:
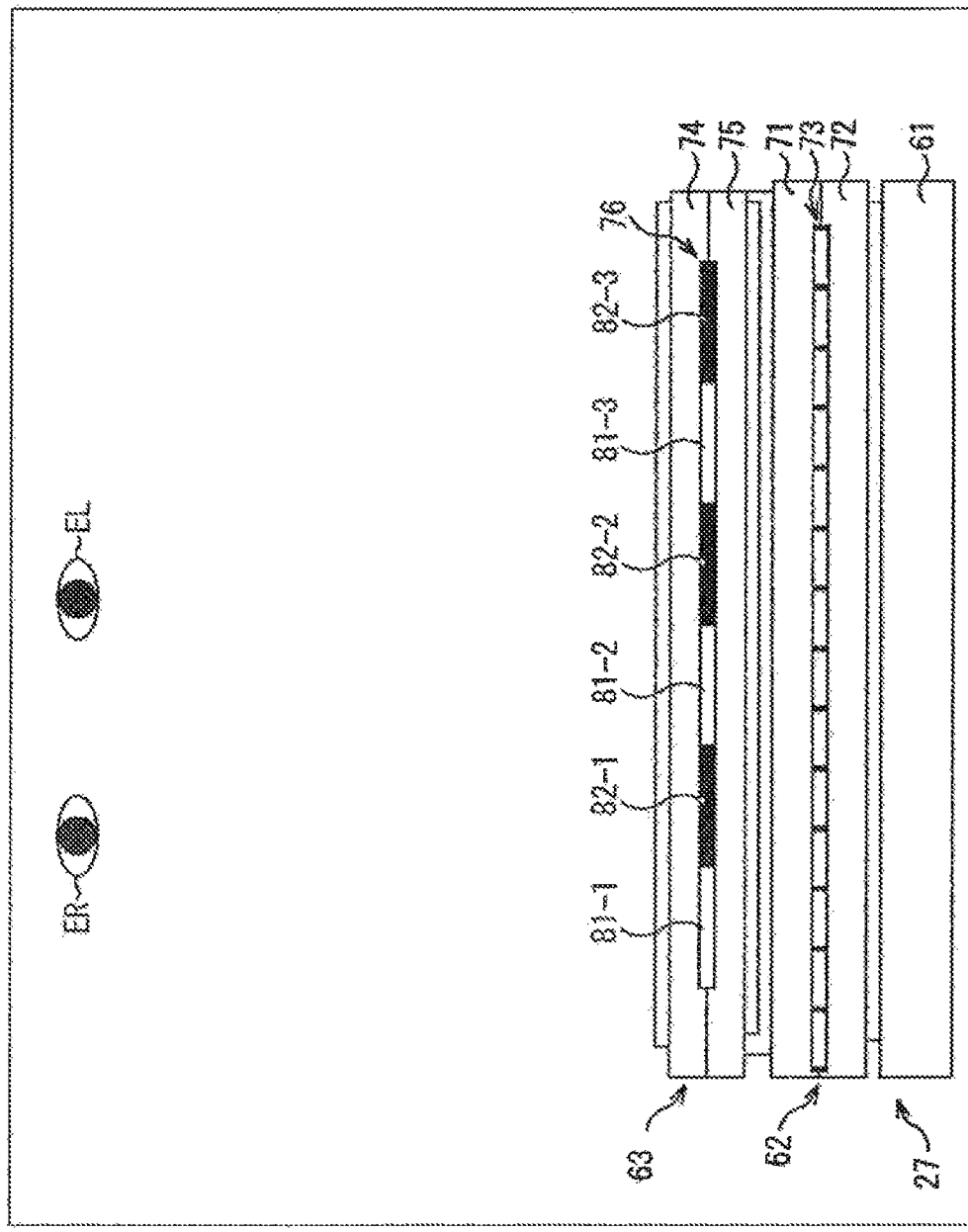
FIG. 2 is a diagram showing a more specific example structure of the display unit.

The display unit 27 shown in FIG. 1 has the structure shown in FIG. 2, for example.

Specifically, the display unit 27 is formed with a backlight 61, an optical modulation panel 62, and a barrier element 63.

The backlight 61 is formed with an LED (Light Emitting Diode) light source, a light-guide panel, and the like, and releases and introduces light for displaying an image into the optical modulation panel 62.

The optical modulation panel 62 is formed with a liquid crystal layer, respective color filters of R, G, and B, and the like, and transmits the light introduced from the backlight 61, so as to display an image. At this point, the optical modulation panel 62 assigns intensity levels to the respective pixels of the image by varying the light transmission rate for each pixel in the optical modulation panel 62.

More specifically, the optical modulation panel 62 includes a transparent substrate 71, a transparent substrate 72, and a liquid crystal layer 73, and the liquid crystal layer 73 is interposed between the plate-like transparent substrates 71 and 72 that are positioned to face each other. Transmissive portions as pixels to display an image are provided in the liquid crystal layer 73. As a voltage is applied to electrodes provided in the transparent substrates 71 and 72 at the time of image display, the transmission rate of the light entering the transmission units from the backlight 61 varies with the applied voltage.

The barrier element 63 is formed with a polarizer, a switch liquid crystal layer, and the like, and shields part of the light entering from the optical modulation panel 62 while passing the other part of the light, so as to optically separate respective parallax images from one another. The barrier element 63 includes a transparent substrate 74, a transparent substrate 75, and a switch liquid crystal layer 76, and the switch liquid crystal layer 76 is interposed between the plate-like transparent substrates 74 and 75 that are positioned to face each other.

Electrodes are formed in the transparent substrates 74 and 75. When a voltage is applied to part or all of those electrodes, the orientation direction of the liquid crystal molecules in the switch liquid crystal layer 76 changes. As a result, a parallax barrier is formed in the switch liquid crystal layer 76.

In the example illustrated in FIG. 2, a parallax barrier formed with opening portions 81-1 through 81-3 that pass the light entering from the optical modulation panel 62, and shielding portions 82-1 through 82-3 that shield the light entering from the optical modulation panel 62 is formed in the switch liquid crystal layer 76.

Hereinafter, the opening portions 81-1 through 81-3 will be also referred to simply as the opening portions 81 where they do not need to be distinguished from one another, and the shielding portions 82-1 through 82-3 will be also referred to simply as the shielding portions 82 where they do not need to be distinguished from one another. In a case where a combined image for stereoscopically displaying an object is displayed on the optical modulation panel 62, the parallax barrier is formed in the barrier element 63. However, in a case where parallax images that are 2D images are displayed on the optical modulation panel 62, the parallax barrier is not formed in the barrier element 63.

At the display unit 27 having the structure shown in FIG. 2, a user views an image displayed on the optical modulation panel 62 from the side of the barrier element 63. Particularly, at the time of displaying of a combined image, light that is emitted from the backlight 61 and passes through the optical modulation panel 62 and the barrier element 63 enter the right eye ER or the left eye EL of the user. At this point, different beams of light separated by the barrier element 63 enter the right eye ER and the left eye EL of the user, and therefore, the right eye ER and the left eye EL view different parallax images each having a parallax.

In FIG. 2, the barrier element 63 is shown as an example of the separating unit that optically separates a parallax image. However, the separating unit is not necessarily a parallax barrier, but may be a lenticular lens. Also, the parallax barrier as the separating unit is not necessarily a variable barrier, but may be a fixed barrier having opening portions in a shield.

Further, the barrier element 63 may be interposed between the optical modulation panel 62 and the backlight 61.

[Viewing of a Stereoscopic Image]

For example, the display unit 27 forming the display device 11 displays parallax images of four different viewpoints, and the user is made to view the parallax images of two of the four viewpoints so that a display device for four viewpoints that can stereoscopically display parallax images is realized.

In FIG. 2, the horizontal direction and the vertical direction are set as the x-direction and the y-direction, respectively, and the direction perpendicular to the x-direction and the y-direction is the z-direction. The x-direction is the direction in which the right eye ER and the left eye EL of the user are aligned, or the parallax direction of the parallax image displayed on the optical modulation panel 62. The y-direction is the direction perpendicular to the display surface of the optical modulation panel 62.

In a case where the display unit 27 is a display device for four viewpoints, block regions formed with the pixels of the four respective channels of channels CH0 through CH3, which are the pixels on which four respective parallax images are to be displayed, are aligned in the x-direction on the display surface of the optical modulation panel 62. For example, in each of the block regions, the pixels of the channel CH0, the channel CH1, the channel CH2, and the channel CH3 are aligned from right to left, and the pixels of the same channel are aligned in the z-direction in FIG. 2.

The barrier element 63 has one opening portion 81 forming the parallax barrier, for one block region. A region formed with the pixels of the same channel in one block region will be hereinafter also referred to as a channel region. The display unit 27 will be further described below as a display device for four viewpoints.

In a case where parallax images of four viewpoints are displayed on a display unit, the display unit normally has block regions formed with pixels of channels CH0 through CH3, and the parallax images of the respective viewpoints are displayed on the pixels of the respective channels.

A predetermined position in front of the display unit is set as a reference position, for example, and the positions and sizes of the opening portions of the display unit are set so that the pixels of the same channel in each one block region can be viewed by the user when the user views the display unit from the reference position. It should be noted that the distance in the y-direction from the display surface of the display unit to the above mentioned reference position will be hereinafter also referred to as the proper viewing distance.

Figure 3:
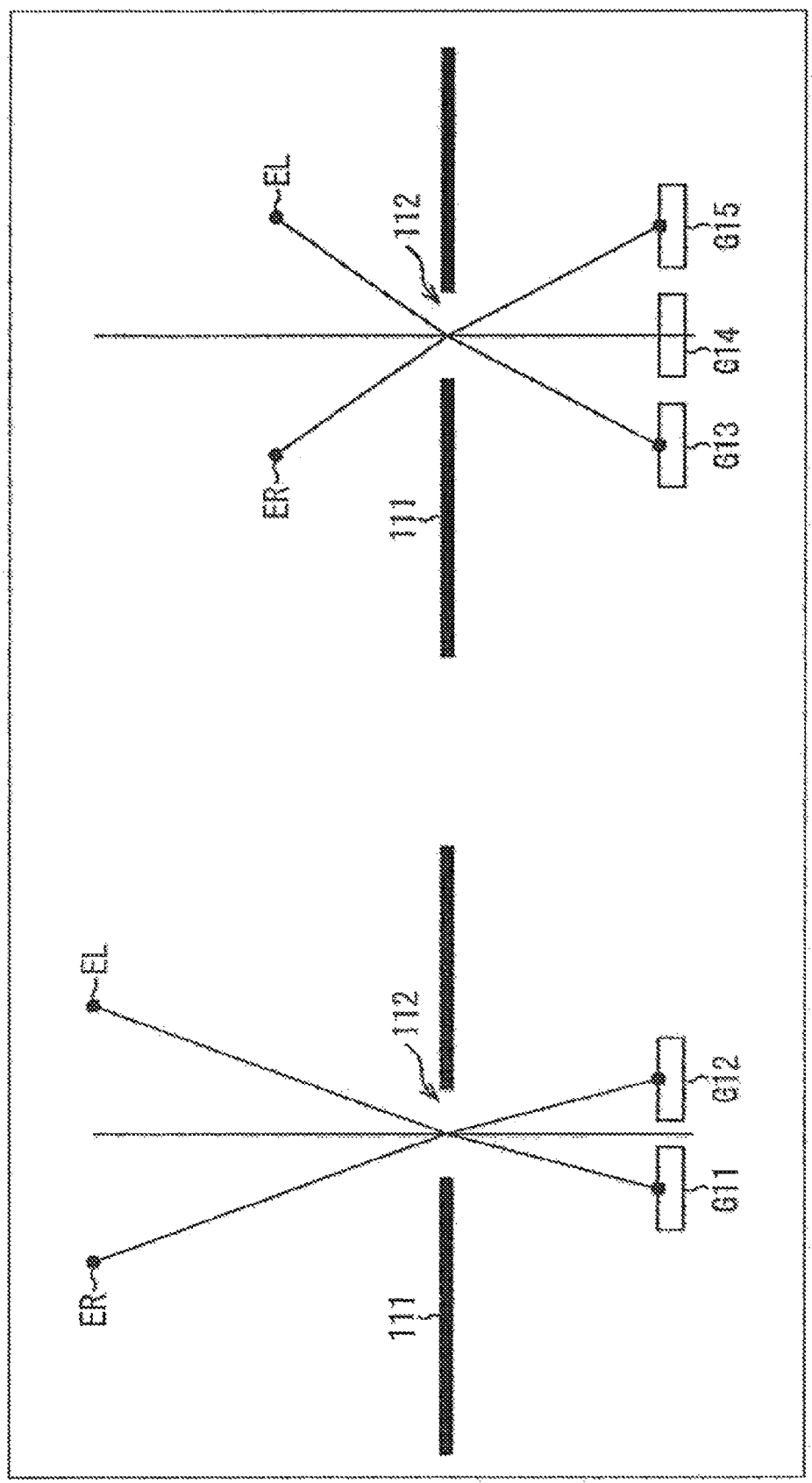
FIG. 3 is a diagram for explaining stereoscopic displaying of parallax images of four viewpoints.

In a case where parallax images of four viewpoints are displayed on such a display unit, pixels adjacent to each other are viewed with the right eye ER and the left eye EL of the user via an opening portion 112 formed in a shielding portion 111 of the display unit, for example, as shown in the left half of FIG. 3. In FIG. 3, the horizontal direction and the vertical direction are the x-direction and the y-direction, respectively.

In the example shown in FIG. 3, a pixel G11 is viewed with the left eye EL of the user, and a pixel G12 adjacent to the pixel G11 is viewed with the right eye ER of the user. At this point, parallax images of different viewpoints are displayed on the pixel G11 and the pixel G12. Therefore, the parallax images of the different viewpoints each having a parallax are viewed with the right and left eyes of the user.

In this situation, the user might move to the right in FIG. 3. Since the pixel G11 and the pixel G12 are adjacent to each other, the right eye ER of the user can see not only the pixel G12, which has been viewed with the right eye ER so far, but also the pixel G11, which has been viewed with the left eye EL. As a result, crosstalk occurs. That is, the user sees two of the object on the parallax images.

When the user views the display unit from a position at a distance that is approximately half the proper viewing distance in the y-direction between the display unit and the viewpoint position of the user, positions located two pixels apart from each other are viewed with the right eye ER and the left eye EL of the user, for example, as shown in the right half of FIG. 3.

In the example shown in FIG. 3, of three pixels G13 through G15 that are serially aligned, the pixel G13 is viewed with the left eye EL of the user, and the pixel G15 located two pixels apart from the pixel G13 is viewed with the right eye ER of the user. Even if the viewpoint position of the user moves slightly to the right in this situation in FIG. 3, the parallax image displayed on the pixel G13 is not viewed with the right eye ER of the user, and therefore, any crosstalk does not occur.

As described above, when the display unit is viewed from a distance that is approximately half the proper viewing distance, the pixels in each block region viewed with the right eye and the left eye of the user are pixels that are two pixels apart from each other.

In a case where parallax images for the right eye and the left eye are to be displayed on the display unit 27, the parallax images for the right eye and the left eye are appropriately displayed on the pixels of the respective channels, and the user views the parallax images from a distance that is approximately half the proper viewing distance. In this manner, occurrence of crosstalk can be prevented.

For example, in a block region on the optical modulation panel 62, the parallax image for the right eye is displayed on the pixels of the channel CH0 and the channel CH1 adjacent to each other, and the parallax image for the left eye is displayed on the pixels of the channel CH2 and the channel CH3 adjacent to each other.

In this case, the parallax image for the right eye is viewed with the right eye ER of the user, and the parallax image for the left eye is viewed with the left eye EL of the user. Even if the user in this situation moves slightly in the x-direction, the pixel of the channel CH0 is located two pixels apart from the pixel of the channel CH2, and therefore, the parallax image for the left eye is not viewed with the right eye ER of the user.

Further, if parallax images displayed on the pixels of the respective channels are switched in accordance with movement of the viewpoint position of the user before crosstalk occurs, the image can be presented more naturally, without the user noticing the switching of the right and left parallax images displayed in the respective regions.

As described above, when parallax images for the right eye and the left eye are appropriately displayed on the pixels of the respective channels in accordance with the viewpoint position of the user, and the user views the parallax images from a distance that is approximately half the proper viewing distance, occurrence of crosstalk is prevented, and an image with higher quality can be presented. Such a method of displaying a stereoscopic image will be hereinafter referred to as the half-distance display method.

[Design of the Parallax Barrier]

In a case where right and left parallax images are displayed by such a half-distance display method, the distance between the opening portions 81, and the distance from the opening portions 31 to the optical modulation panel 62 need to be appropriately set so that the user viewing the display unit 27 from a position at a distance that is approximately half the normal proper viewing distance can view the pixels of the same channel via each opening portion 81.

For example, the distance between the right eye ER and the left eye EL (hereinafter referred to as the inter-eye distance E) of the user is 65 mm, and the proper viewing distance Z0 is 900 mm. The inter-eye distance of an average adult is approximately 65 mm.

Figure 4:
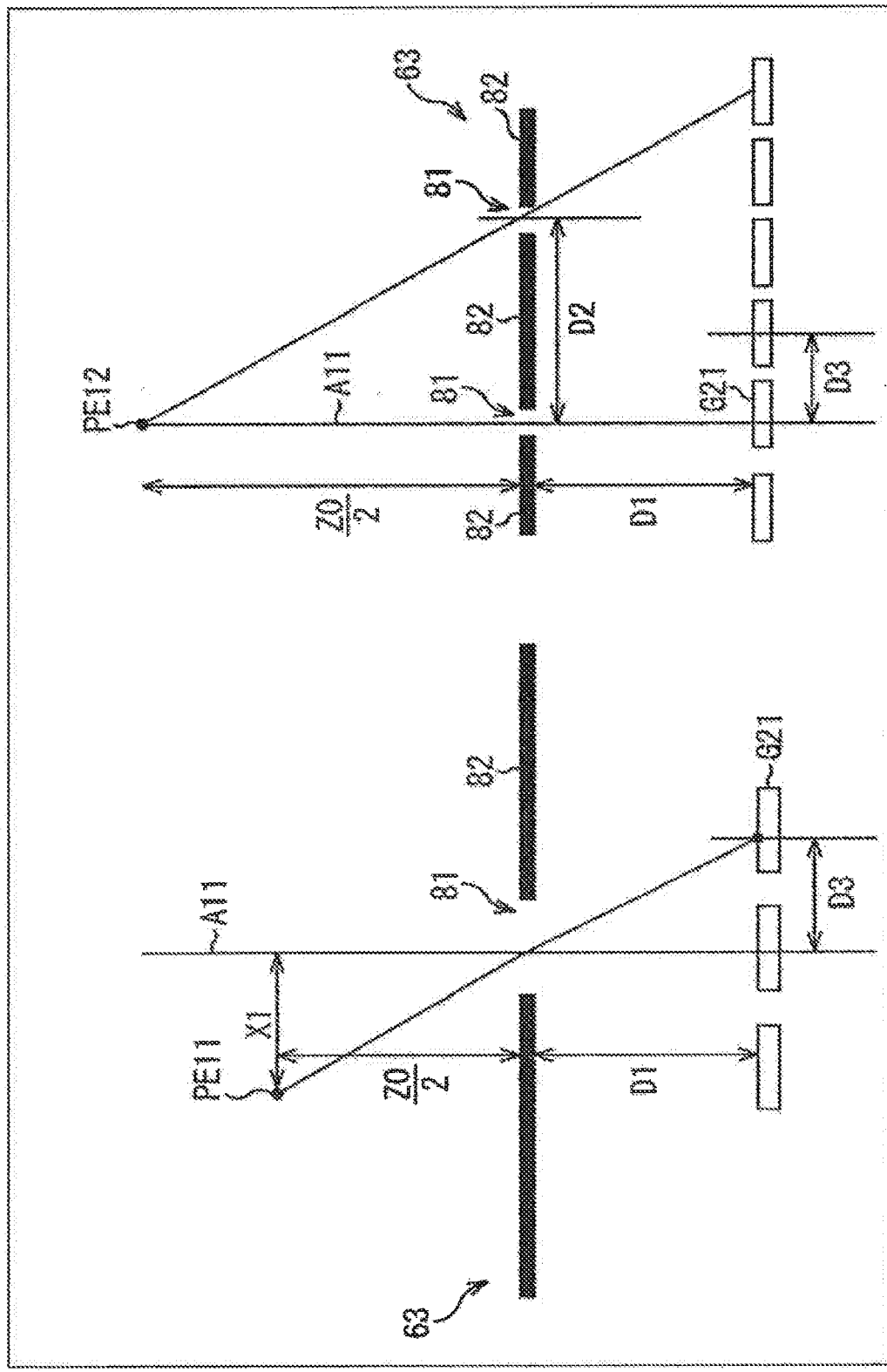
FIG. 4 is a diagram for explaining the designs of the respective parts of opening portions.

In this case, the distance D1 from each opening portion 81 to the optical modulation panel 62, and the distance D2 between the opening portions 81 are determined as shown in FIG. 4. In the drawing, the horizontal direction and the vertical direction are the x-direction and the y-direction, respectively.

In the left half of FIG. 4, the straight line that passes through the center of an opening portion 81 and runs parallel to the y-direction is set as a straight line A11, and one of the eyes of the user is located at a point PE11. Here, the point PE11 is located at a distance X1 in the x-direction from the straight line A11, and is located at a distance Z0/2=450 mm in the y-direction from the opening portion 81. In the drawing of the barrier element 63, the rectangles shown in a lower portion represent pixels on the optical modulation panel 62.

For example, a pixel G21 of those pixels is viewed from the position PE11 of one eye of the user via the opening portion 81, as shown in the left half of the drawing. Where the distance between the pixels is D3, the center of the pixel G21 is located D3 apart from the straight line A11.

Here, the space between the barrier element 63 and the respective pixels of the optical modulation panel 62 is filled with a glass material. Where the relative refractive index of light traveling from the point PE11 to the glass material is represented by k1, X1:Z0/2=D3:D1/k1. Accordingly, D1= (Z0/2)×D3×k1/X1. For example, where Z0=900 mm, D3=0.05435 mm, X1=32.5 mm, and k1=0.5, D1 is expressed from those values as 900/2×0.05435×1.5/32.5=1.1288 mm.

Also, an eye of the user might be located at a point PE12 on the straight line A11, as shown in the right half of the drawing. In this case, the optical modulation panel 62 is for four viewpoints, and the position of the optical modulation panel 62 seen via the left-side opening portion 81 from the point PE12 in the drawing, and the position of the optical modulation panel 62 seen via the opening portion 81 located to the right of the opening portion 81 should be four pixels apart from each other.

Therefore, Z0/2:D2=((Z0/2)+D1/k1):4×D3. Accordingly, the distance D2 between the opening portions 81 is determined from D2=Z0/2×D3×4/((Z0/2)+(D1/k1)). Where Z0=900 mm, D3=0.05435 mm, D1=1.1288 mm, and k1=1.5, D2 is expressed from those values as 900/2×0.05435×4/((900/2)+(1.1288/1.5))=0.217037 mm.

[Viewing from a Distance Half the Proper Viewing Distance]

Figure 5:
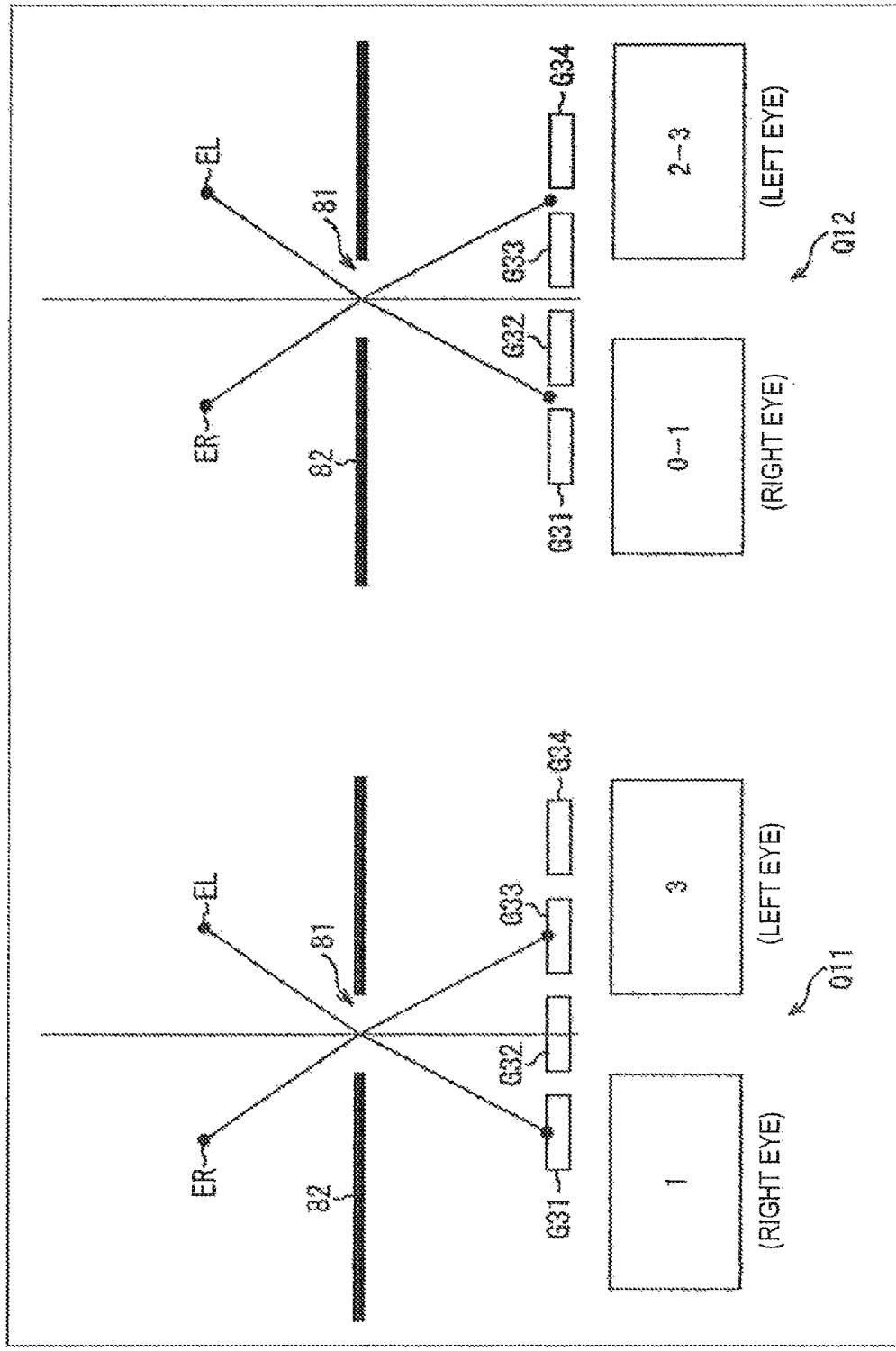
FIG. 5 is a diagram for explaining viewing from a distance that is half the proper viewing distance.

In a case where the size and the position of each opening portion 81 with respect to the optical modulation panel 62 are determined in the above described manner, there may be a design in which the centers of pixels are viewed when the user sees an opening portion 81 from in front of the optical modulation panel 62, and may be a design in which spaces between pixels are viewed when the user sees an opening portion 81 from in front of the optical modulation panel 62, for example, as shown in FIG. 5.

In FIG. 5, the horizontal direction and the vertical direction are the x-direction and the y-direction, respectively. The viewpoint position of the user is located at a distance Z0/2 in the y-direction from the center of the optical modulation panel 62. That is, the user observes the optical modulation panel 62 from the front and from a position at the distance Z0/2 from the optical modulation panel 62.

For example, in the design illustrated in the left half of FIG. 5, of pixels G31 through G34 in the block region formed for an opening portion 81, the center of the pixel G31 is viewed with the left eye EL of the user, and the center of the pixel G33 is viewed with the right eye ER of the user. Here, the pixels G31 through G34 are the pixels of the channels CH3 through CH0, respectively.

In this case, the center of the pixel of the channel CH3 in each block region of the entire optical modulation panel 62 is viewed with the left eye EL of the user, and the center of the pixel of the channel CH1 in each block region of the entire optical modulation panel 62 is viewed with the right eye ER of the user, as indicated by an arrow Q11.

More specifically, the refraction angle of light that is emitted from the optical modulation panel 62 and enters an eye of the user via the opening portion 81 varies with positions on the optical modulation panel 62. Therefore, in a block region located away from the center of the optical modulation panel 62, the portion of each pixel viewed by the user is slightly away from the center of the pixel.

In such a design illustrated in the left half of FIG. 5, when the user views the optical modulation panel 62 from the front, the center of a pixel is viewed with each eye of the user via each opening portion 81, and accordingly, the image displayed on the optical modulation panel 62 appears bright.

In a case where a stereoscopic image is displayed by the half-distance display method while the user is viewing the optical modulation panel 62 from the front, control is performed so that the parallax image for the right eye is displayed on the pixel of the channel CH1 in each block region, and the parallax image for the left eye is displayed on the pixel of the channel CH3 in each block region. In this case, the parallax images for the right eye and the left eye to be displayed on the channel CH0 and the channel CH2 need to be switched between the right half and the left half of the optical modulation panel 62 seen from the user, with the center of the optical modulation panel 62 defining the right half and the left half, as will be described later.

In the design illustrated in the right half of FIG. 5, on the other hand, a position between the pixel G31 and the pixel G32 among the pixels G31 through G34 in the block region provided for an opening portion 81 is viewed with the left eye EL of the user, for example. Also, a position between the pixel G33 and the pixel G34 is viewed with the right eye ER of the user.

In this case, the pixels of the channel CH0 and the channel CH1 in each block region of the entire optical modulation panel 62 are viewed with the right eye ER of the user, as indicated by an arrow Q12. Also, the pixels of the channel CH2 and the channel CH3 in each block region of the entire optical modulation panel 62 are viewed with the left eye EL of the user.

More specifically, as the refraction angle of light entering an eye of the user from a pixel of the optical modulation panel 62 varies with positions on the optical modulation panel 62, each eye of the user sees a slightly larger area of one of two pixels than the other.

In the design illustrated in the right half of FIG. 5, when the user views the optical modulation panel 62 from the front, the parallax image for the right eye is displayed on the pixels of the channel CH0 and the channel CH1, and the parallax image for the left eye is displayed on the channel CH2 and the channel CH3 in each block region. This design has the advantage that display control on parallax images is easier.

In a situation where the user sees the optical modulation panel 62 from the front, each eye of the user sees a portion between pixels in each block region, and therefore, the parallax images recognized by the user might appear somewhat darker.

If the user viewing the optical modulation panel 62 from the front moves the viewpoint position in the x-direction, however, each of the eyes of the user repeatedly alternates between viewing the center of a pixel and viewing a portion between pixels. In view of this, the display control on parallax images in the display device 11 is basically the same between the structure illustrated in the right half of the drawing and the structure illustrated in the left half of the drawing.

[Display Control by the Half-Distance Display Method]

Next, control to be performed to display a stereoscopic image by the half-distance display method based on parallax images for the left eye and the right eye is specifically described.

In the display device 11, when the viewpoint position of the user is detected, which positions on which pixels in each block region (opening portion 81) are to be viewed by the user are calculated based on the viewpoint position. Based on the calculation result, the parallax image for the right eye or the left eye is allocated to the pixel of each channel in each block region.

More specifically, the display device 11 identifies the location of the block region having the highest luminance of light from pixels to be viewed by the user among the block regions on the display surface of the optical modulation panel 62, and sets the location as the boundary position. That is, the location of the block region in which the centers of pixels are to be viewed with the eyes of the user is set as the boundary position.

After identifying the boundary position, the display device 11 allocates the right, and left parallax images to the pixels of the respective channels in each of regions separated by the boundary position on the optical modulation panel 62. At this point, the same parallax images are invariably allocated to the pixels of the same channel in all, the block regions in each one of the regions separated by the boundary position.

A combined image is then generated in accordance with the allocation of parallax images to the pixels of the respective channels in those block regions, and the generated combined image is displayed on the optical modulation panel 62.

Further, when the viewpoint position of the user moves in this situation, the portions of the pixels being viewed by the user change in each block region, and accordingly, the boundary position also moves with the change in the viewpoint position. Therefore, as the boundary position moves, the allocation of the parallax images to the pixels of the respective channels in the block regions is changed.

Hereinafter, each region formed with block regions that are serially aligned and have the same parallax images allocated to the pixels of the same channels in the optical modulation panel 62 will be also referred to as a serial block region. That is, the regions separated by the boundary position are the serial block regions.

The boundary position between the serial block regions is the position of the block region having the highest luminance of light from the pixels being viewed by the user, as described above. Here, the block region having the highest luminance is the block region in which the centers of pixels are being viewed by the user.

Meanwhile, it is known that, near the edges of the display unit 27, the apparent thickness of the glass material interposed between the barrier element 63 and the optical modulation panel 62 is smaller. Therefore, in a case where the boundary position between the serial block regions is determined based on the viewpoint position of the user, it is preferable that which positions on the pixels of which channels are being viewed by the user are accurately determined in each block region by using exact formulas of incident angle and refraction angle of light.

Figure 6:
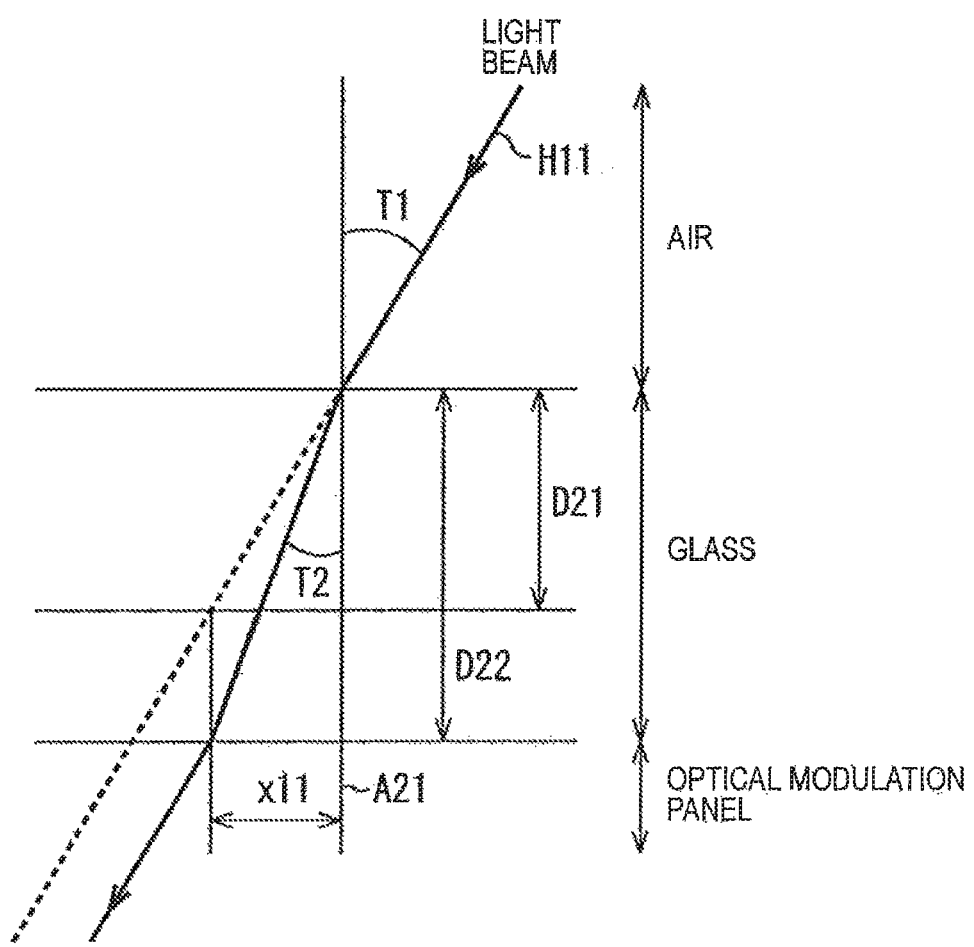
FIG. 6 is a diagram for explaining a viewed position calculation.

For example, a predetermined light beam H11 passes through the air, enters the glass material having a thickness D21, and reaches the surface of the optical modulation panel 62, as shown in FIG. 6. The straight line that passes through the incident position of the light beam H11 incident on the glass material, and extends perpendicularly to the surface of the glass material is set as a straight line A21.

At this point, as for the incident angle T1 of the light beam H11 that propagates in the air and enters the glass material, the angle T2 between the light path of the light beam H11 after entering the glass material and the straight line A21 is determined from the relative refractive index k11 of the light beam H11 traveling from the air into the glass material and the incident angle T1. That is, the angle T2 is expressed as T2=a sin(sin(T1/k11)).

After the angle T2 is determined, the distance x11 from the straight line A21 to the position of incidence of the light beam H11 on the surface of the optical modulation panel 62 is determined from the apparent thickness D22 of the glass material and the angle T2. That is, the distance x11 is expressed as x11=D22×tan(T2).

As the distance x11 is determined in this manner, the accurate positions on the pixels being viewed by the user (hereinafter also referred to as the viewed positions of pixels) can be determined in each block region.

Figure 7:
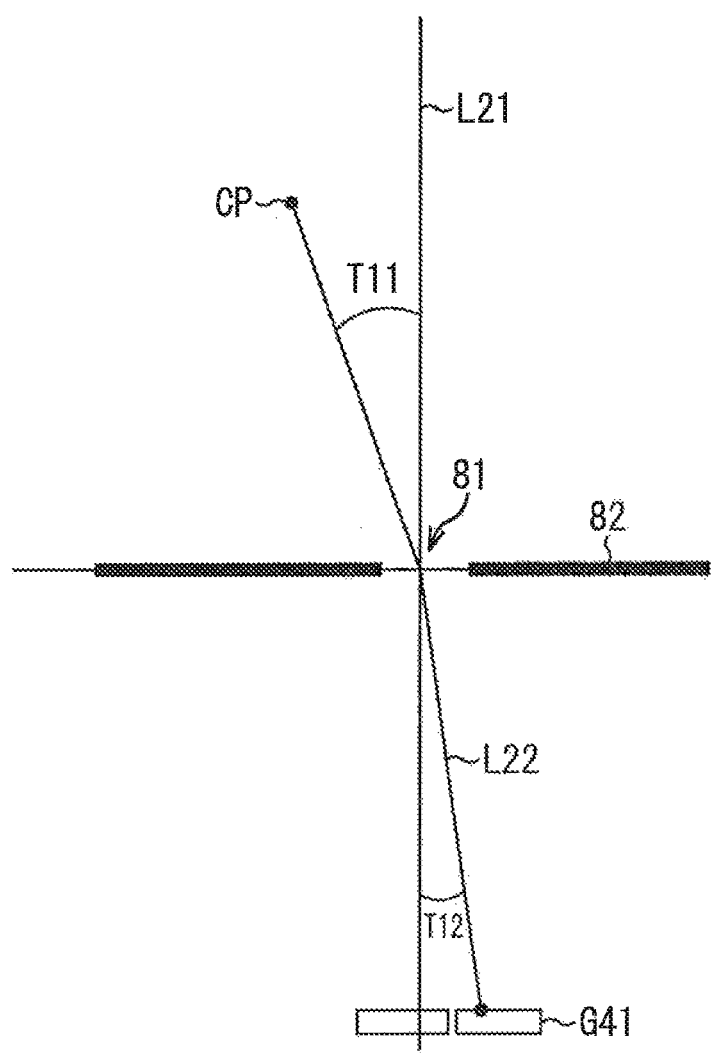
FIG. 7 is a diagram for explaining a viewed position calculation.

Specifically, as shown in FIG. 7, the horizontal direction or the direction parallel to the display surface of the optical modulation panel 62 in the drawing is the x-direction, the vertical direction or the direction perpendicular to the display surface of the optical modulation panel 62 in the drawing is the y-direction, and a predetermined position in the xy coordinate system is the position CP of an eye of the user, for example.

The opening portion 81 located at the center of the barrier element 63 is the 0th opening portion 81, the opening portion 81 located n opening portions to the left of the 0th opening portion 81 in the drawing is the nth opening portion 81, and the opening portion 81 located n opening portions to the right of the 0th opening portion 81 in the drawing is the −nth opening portion 81.

Here, at the nth opening portion 81 (hereinafter also referred to as the opening portion 81 with the number n), which channels' pixels in the block region are to be viewed by the user through the opening portion 81 is determined. First, the incident angle T11 of a light beam from the position CP onto the nth opening portion 81 is determined from the coordinates of the position CP and the coordinates of the center position of the opening portion 81. That is, the incident angle T11 is the angle between a straight line L21 parallel to the y-direction and the light beam from the position CP.

After the incident angle T11 is determined, the angle T12 between the straight line L21 and the light beam that enters the opening portion 81 from the position CP and travels to the optical modulation panel 62 or a straight line L22 indicating the light path of the light beam is determined. That is, the angle T12=a sin(sin(T11/k11)) is determined from the incident angle T11 and the refractive index k11 of the glass material interposed between the opening portion 81 and the pixels of the optical modulation panel 62, as described above with reference to FIG. 6.

As a result, the formula representing the straight line L22 (y=ax+b, for example) is determined. Accordingly, which positions on the pixels of which channels are to be viewed by the user can be determined by calculating the coordinates of the point at which the straight line L22 indicating the light path of the light beam intersects with a pixel of the optical modulation panel 62. In FIG. 7, the light beam from the position CF has reached a pixel G41, and it is apparent that the pixel G41 is to be viewed by the user.

Figure 8:
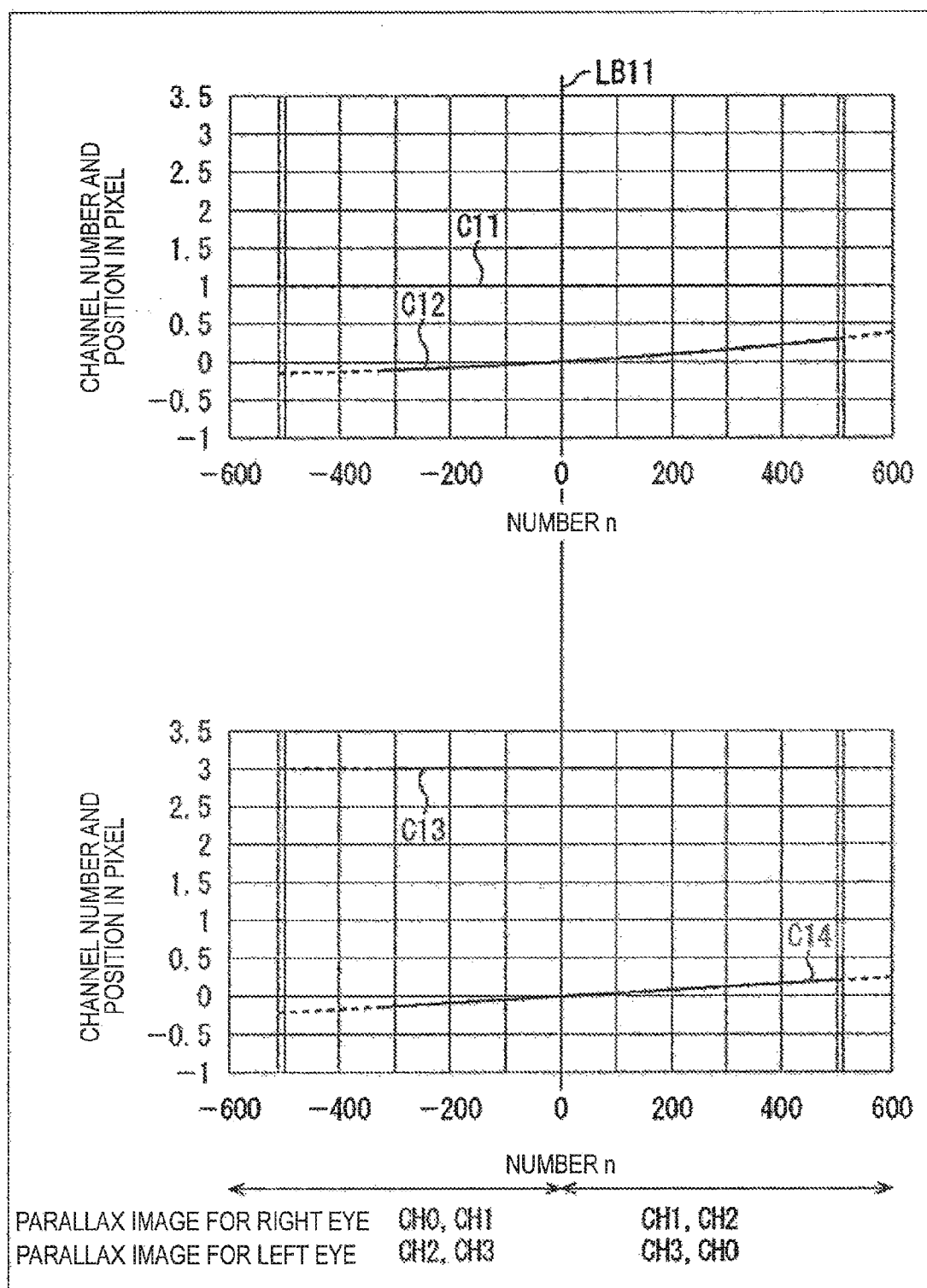
FIG. 8 is a diagram for explaining allocation of parallax images.

The position in a pixel to be viewed by the user or the position in a pixel to be viewed by the user is represented by a value from −0.5 to 0.5, with the center position of the pixel being 0. For example, the position of the left edge of the pixel in the drawing is represented by +0.5, and the position of the right edge of the pixel in the drawing is represented by −0.5.

Where the channel m of the pixel to be viewed by the user (hereinafter also referred to as the viewed pixel) in each block region (opening portion 81), and the viewed position on the viewed pixel are determined for the right eye and the left eye of the user in the above manner, the results shown in FIG. 8 are obtained.

In FIG. 8, the abscissa axis indicates the number n of each opening portion 81, and the ordinate axis indicates the channel number or the viewed position of each viewed pixel. The direction from the 0th opening portion 81 toward the nth ($1 \leq n$) opening portion 81 is the +x-direction, and the direction opposite from the +x-direction is the −x-direction.

In FIG. 8, a straight line C11 indicates the channel number of the viewed pixel in each block region to be seen from the right eye of the user, and a curve C12 indicates the viewed position in the viewed pixel in each block region to be seen from the right eye of the user.

In this case, it can be seen that the pixels of the channel CH1 are viewed with the right eye of the user via all the opening portions 81 in all the block regions on the optical modulation panel 62. It can also be seen that the right eye of the user viewing the 0th opening portion 81 views the center (center point) of the pixel of the channel CH1.

Further, it can be seen that the position on the pixel to be viewed with the right eye of the user deviates in the +x-direction from the center, as the opening portion 81 becomes further away in the +x-direction from the 0th opening portion 81. On the other hand, it can be seen that the position on the pixel to be viewed with the right eye of the user deviates in the −x-direction from the center, as the opening portion 81 becomes further away in the −x-direction from the 0th opening portion 81.

In FIG. 8, a straight line C13 indicates the channel number of the viewed pixel in each block region to be seen from the left eye of the user, and a curve C14 indicates the viewed position in the viewed pixel in each block region to be seen from the left eye of the user, as in the case of the right eye.

For example, as can be seen from the straight line C13, the pixels of the channel CH3 are viewed with the left eye of the user via all the opening portions 81, and the center of the pixel of the channel CH3 is viewed with the left eye of the user viewing the 0th opening portion 81.

Also, it can be seen that, as the opening portion 81 becomes further away in the +x-direction from the 0th opening portion 81, the viewed position deviates in the +x-direction from the pixel center, and, as the opening portion 31 becomes further away in the −x-direction from the 0th opening portion 81, the viewed position deviates in the −x-direction from the pixel center.

Having obtained such calculation results, the display device 11 sets the position of the block region (opening portion 81) having the viewed position 0 as the boundary position LB11 between the serial block regions based on the curve C12 and the curve C14. More specifically, the position in which the curves indicating the viewed positions in the respective opening portions 81 such as the curve C12 and the curve C14 cross the ordinate axis at 0 in each section in which the pixels of the same channel are the viewed pixels, or the position in which the values representing the viewed positions switch from negative values to positive values, is set as the boundary position.

After determining the boundary position LB11 in the above manner, the display device 11 allocates parallax images to the pixels of the respective channels in each of the serial block regions separated by the boundary position LB11.

Specifically, in each block region located between the edge of the optical modulation panel 62 on the −x-direction side and the boundary position LB11, the parallax image for the right eye is allocated to the pixels of the channel CH0 and the channel CH1, and the parallax image for the left eye is allocated to the pixels of the channel CH2 and the channel CH3.

In the region to the left of the boundary position LB11 in the drawing, the pixels of the channel CH1 are viewed with the right eye of the user, and the viewed positions deviate from the centers of the viewed pixels to the left in the drawing or toward the pixels of the channel CH0. Therefore, in the region to the left of the boundary position LB11, the parallax image for the right eye is allocated to the pixels of the channel CH0 and the channel CH1.

Likewise, in each block region located between the edge of the optical modulation panel 62 on the +x-direction side and the boundary position LB11, the parallax image for the right eye is allocated to the pixels of the channel CH1 and the channel CH2, and the parallax image for the left eye is allocated to the pixels of the channel CH0 and the channel CH3.

In the example illustrated in FIG. 8, the pixels of the same channel in the respective block regions are viewed as the viewed pixels with an eye of the user. However, when the viewpoint position of the user moves, the channel having pixels to be viewed as the viewed pixels may vary with block regions, for example, as shown in FIG. 9.

Figure 9:
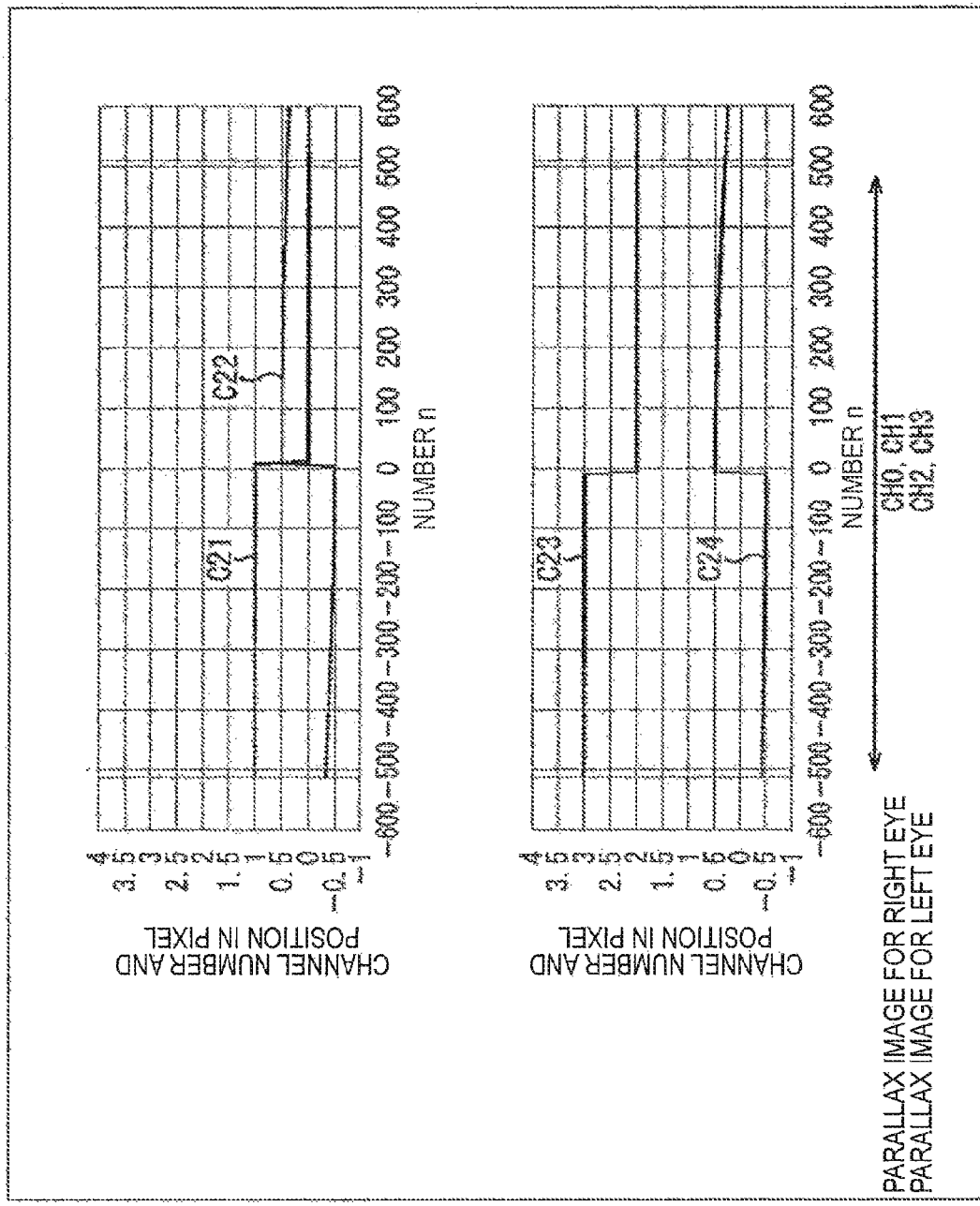
FIG. 9 is a diagram for explaining allocation of parallax images.

In FIG. 9, the abscissa axis indicates the number n of each opening portion 81, and the ordinate axis indicates the channel number or the viewed position of each viewed pixel.

In FIG. 9, a polygonal line C21 indicates the channel number of the viewed pixel in each block region to be seen from the right eye of the user, and a polygonal line C22 indicates the viewed position in the viewed pixel in each block region to be seen from the right eye of the user.

In this example, it can be seen that, at the opening portions 81 located on the +x-direction side of the 0th opening portion 81, positions on the +x-direction sides in the pixels of the channel CH0 are viewed with the right eye of the user via those opening portions 81. It can also be seen that, at the opening portions 81 located on the −x-direction side of the 0th opening portion 81, positions on the −x-direction sides in the pixels of the channel CH1 are viewed with the right eye of the user via those opening portions 81.

Likewise, in FIG. 9, a polygonal line C23 indicates the channel number of the viewed pixel in each block region to be seen from the left eye of the user, and a polygonal line C24 indicates the viewed position in the viewed pixel in each block region to be seen from the left eye of the user.

As can be seen from the polygonal line C23 and the polygonal line C24, at the opening portions 81 located on the +x-direction side of the 0th opening portion 81, positions on the +x-direction sides in the pixels of the channel CH2 are viewed with the left eye of the user via those opening portions 81. It can also be seen that, at the opening portions 81 located on the −x-direction side of the 0th opening portion 81, positions on the −x-direction sides in the pixels of the channel CH3 are viewed with the left eye of the user via those opening portions 81.

In the example illustrated in FIG. 9, the polygonal line C22 and the polygonal line C24 representing viewed positions do not cross the viewed position "0" (do not intersect with 0) in each section in which the pixels of the same channel are the viewed pixels, and therefore, any boundary position is not set.

Therefore, in this case, the parallax image for the right eye is allocated to the pixels of the channel CH0 and the channel CH1, which are viewed pixels, in each block region in the entire area of the optical modulation panel 62. In each block region, the parallax image for the left eye is allocated to the pixels of the channel CH2 and the channel CH3, which are viewed pixels. In the example illustrated in FIG. 9, the entire optical modulation panel 62 is regarded as one serial block region, since there is not a boundary position.

As described above, once the channel numbers of the viewed pixels and the viewed positions in the viewed pixels are determined for each opening portion 81 (block region), the boundary position between the serial block regions is determined. As a result, the channels to which the right and left parallax images are to be allocated are determined in each block region belonging to the respective serial block regions.

The boundary position between the serial block regions when seen from the right eye is ideally the same as the boundary position when seen from the left eye. However, the right eye and the left eye of the user are located in different positions in reality, and a difference might appear between the boundary positions as shown in FIG. 10, for example.

The difference between the boundary position based on the right eye of the user and the boundary position based on the left eye of the user becomes larger in a position further away from the center in the x-direction.

Figure 10:
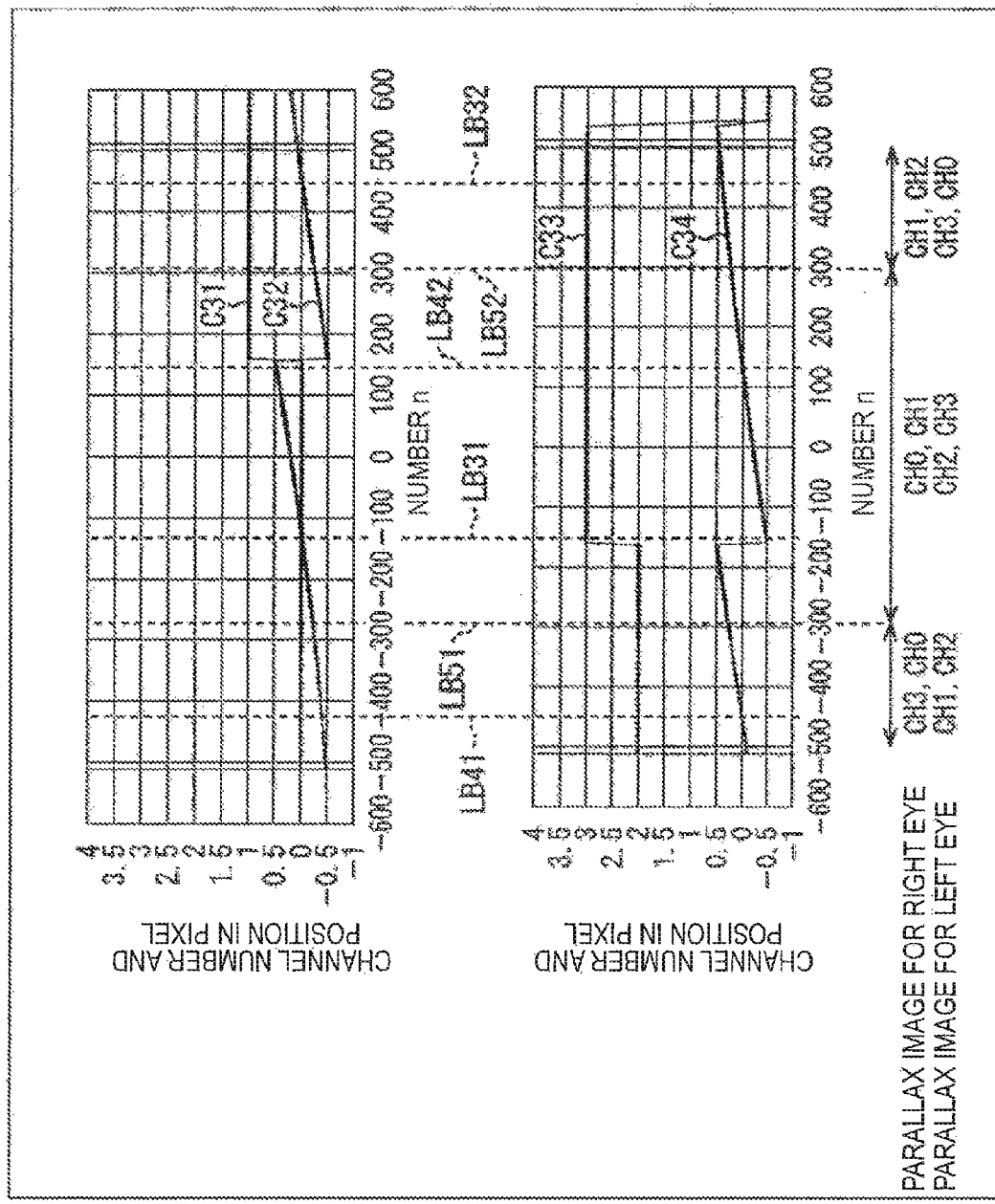
FIG. 10 is a diagram for explaining allocation of parallax images.

In FIG. 10, the abscissa axis indicates the number n of each opening portion 81, and the ordinate axis indicates the channel number or the viewed position of each viewed pixel.

In FIG. 10, a polygonal line C31 indicates the channel number of the viewed pixel in each block region to be seen from the right eye of the user, and a polygonal line C32 indicates the viewed position in the viewed pixel in each block region to be seen from the right eye of the user. A straight line LB31 and a straight line LB32 each indicate a boundary position between serial block regions that is determined from the polygonal line C32.

Further, a polygonal line C33 indicates the channel number of the viewed pixel in each block region to be seen from the left eye of the user, and a polygonal line C34 indicates the viewed position in the viewed pixel in each block region to be seen from the left eye of the user. A straight line LB41 and a straight line LB42 each indicate a boundary position between serial block regions that is determined from the polygonal line C34.

Hereinafter, the straight line LB31 and the straight line LB32 will be also referred to as the boundary position LB31 and the boundary position LB32, and the straight line LB41 and the straight line LB42 will be also referred to as the boundary position LB41 and the boundary position LB42.

In the example illustrated in FIG. 10, the boundary position LB41 and the boundary position LB42 based on the left eye correspond to the boundary position LB31 and the boundary position LB32 based on the right eye, but there are differences between those boundary positions. With such differences, inconsistencies appear in allocation of parallax images to the pixels of the respective channels in the block regions.

For example, on the basis of the right eye, the parallax image for the right eye is allocated to the pixels of the channel CH0 and the channel CH3 in the block regions located between the edge of the optical modulation panel 62 on the −x-direction side and the boundary position LB31. On the basis of the left eye, the parallax image for the left eye is allocated to the pixels of the channel CH2 and the channel CH3 in the block regions located between the boundary position LB41 and the boundary position LB42.

As a result, in the block regions located between the boundary position LB41 and the boundary position LB31, both the parallax image for the right eye and the parallax image for the left eye are allocated to the pixels of the channel CH3.

Therefore, in the display device 11, the intermediate position (the average position) between the boundary position LB31 and the boundary position LB41, and the intermediate position between the boundary position LB32 and the boundary position LB42 are set as a boundary position LB51 and a boundary position LB52 that are eventual boundary positions.

Accordingly, the regions separated by the boundary position LB51 and the boundary position LB52 are set as serial block regions as shown in the lower half in the drawing, for example, and the parallax images are allocated in each of the block region. In the lower half of the drawing, the channel numbers of the pixels to which the parallax image for the right eye and the parallax image for the left eye are to be allocated in each region are shown.

For example, in the block regions between the edge of the optical modulation panel 62 on the −x-direction side and the boundary position LB51, the parallax image for the right eye is allocated to the pixels of the channel CH0 and the channel CH3, and the parallax image for the left eye is allocated to the pixels of the channel CH1 and the channel CH2.

Also, in the block regions between the boundary position LB51 and the boundary position LB52, the parallax image for the right eye is allocated to the pixels of the channel CH0 and the channel CH1, and the parallax image for the left eye is allocated to the pixels of the channel CH2 and the channel CH3. Further, in the block regions between the boundary position LB52 and the edge of the optical modulation panel 62 on the +x-direction side, the parallax image for the right eye is allocated to the pixels of the channel CH1 and the channel CH2, and the parallax image for the left eye is allocated to the pixels of the channel CH0 and the channel CH3.

Where the intermediate position between a boundary position based on the right eye and a boundary position based on the left eye is set as an eventual boundary position between serial block regions, small inconsistencies appear in the allocation of the parallax images based on the right eye and the left eye in the vicinity of the boundary position, but stereoscopic viewing of the parallax images is not particularly affected.

However, if the viewpoint position of the user deviates from Z0/2, which is the optimum viewing distance by the half-distance display method, or if the viewpoint position of the user moves closer to or away from the display unit 27, for example, the difference between the boundary position based on the right eye and the boundary position based on the left eye becomes gradually larger.

Figure 11:
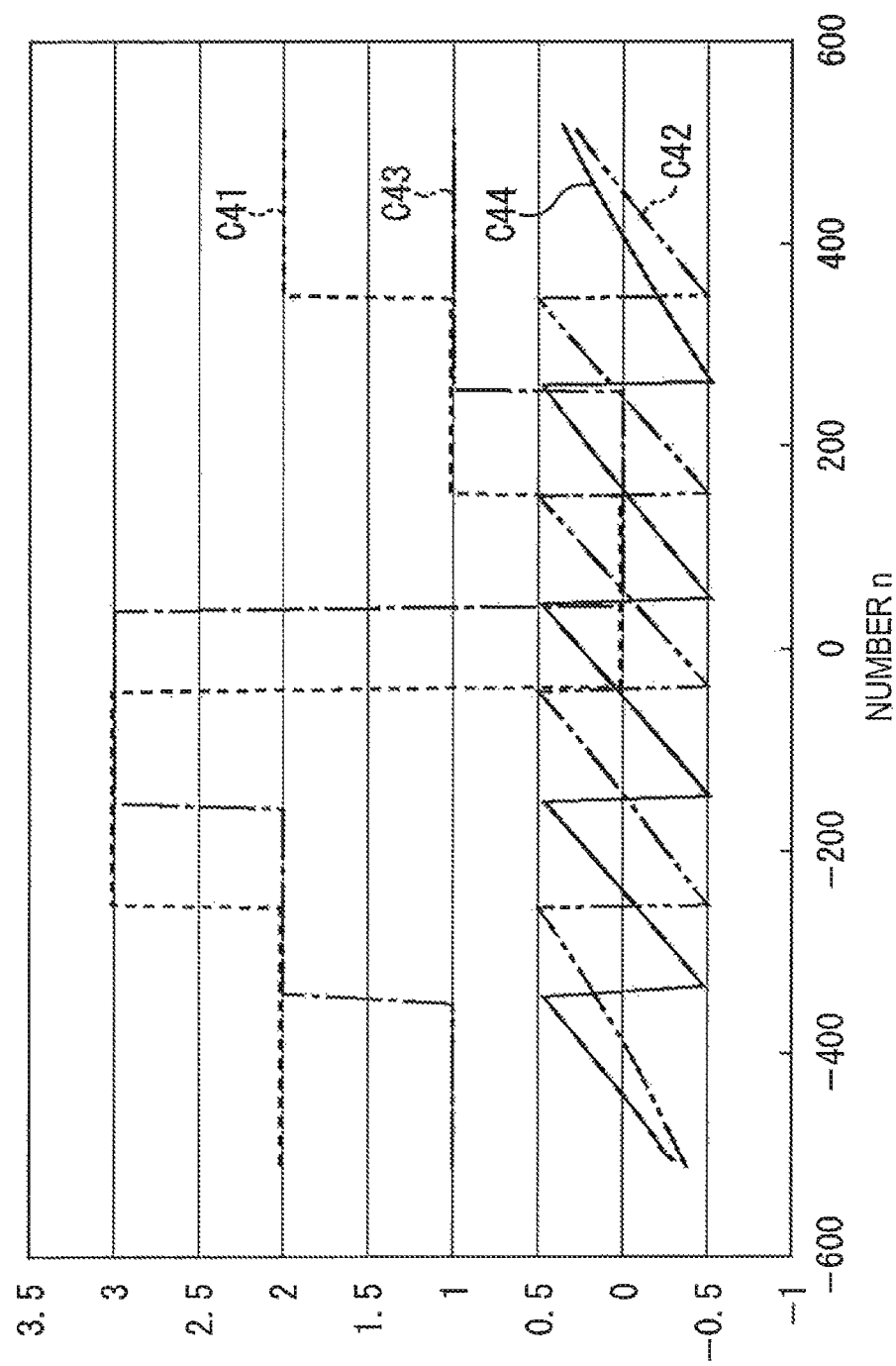
FIG. 11 is a diagram for explaining viewpoint positions where stereoscopic displaying is not possible.

As a result, in some block regions, the pixels of the same channel are viewed as viewed pixels with both the right eye and the left eye of the user, for example, as shown in FIG. 11. In FIG. 11, the abscissa axis indicates the number n of each opening portion 61, and the ordinate axis indicates the channel number or the viewed position of each viewed pixel.

In FIG. 11, a polygonal line C41 indicates the channel number of the viewed pixel in each block region to be seen from the right eye of the user, and a polygonal line C42 indicates the viewed position in the viewed pixel in each block region to be seen from the right eye of the user. A polygonal line C43 indicates the channel number of the viewed pixel in each block region to be seen from the left eye of the user, and a polygonal line C44 indicates the viewed position in the viewed pixel in each block region to be seen from the left eye of the user.

in this example, the polygonal line C41 and the polygonal line C43 overlap each other, and, in the block regions at the overlapping portions, the pixels of the same channel are viewed as viewed pixels with the right eye and the left eye of the user. Therefore, both the parallax images for the right eye and the left eye are allocated to the same channel. As a result, the user cannot stereoscopically view the object, and stereoscopic displaying with the parallax image for the right eye and the parallax image for the left eye cannot be performed.

Where the viewed pixels in each of the opening portions 81 (block regions) are determined in each viewpoint position in the above manner, a check can be made to determine from the result whether stereoscopic viewing of parallax images is possible when the user views the display unit 27 from the present viewpoint position.

Figure 12:
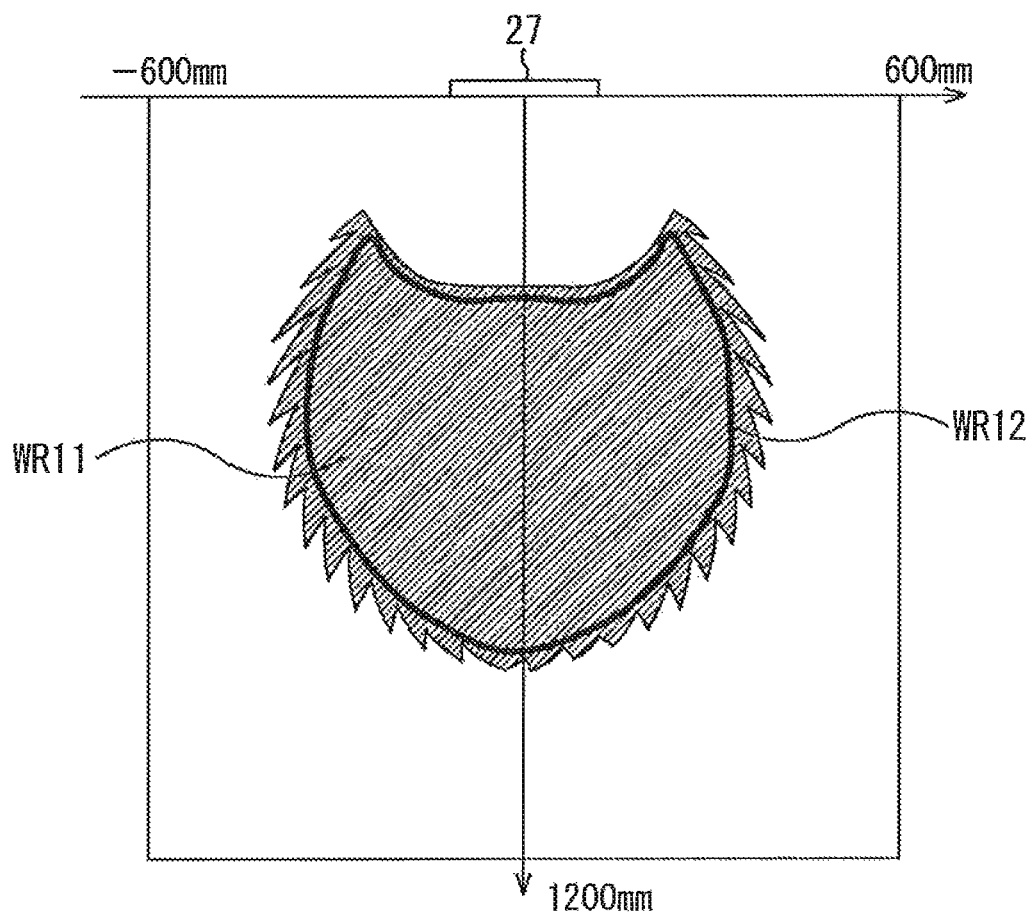
FIG. 12 is a diagram for explaining a region where stereoscopic displaying is possible.

Accordingly, if a calculation to determine viewed pixels is performed for each block region with respect to each viewpoint position, a stereoscopically displayable (stereoscopically viewable) region and a stereoscopically non-displayable region can be determined in the x-y plane, for example, as shown in FIG. 12. In FIG. 12, the horizontal direction and the vertical direction are the x-direction and the y-direction, respectively.

In the example illustrated in FIG. 12, a shaded region WR11 in the region surrounding the display unit 27 indicates the region in which stereoscopic displaying of parallax images is possible. In a case where stereoscopic displaying of parallax images is performed by the half-distance display method, the display device 11 sets a region WR12 in the region WR11 as the region in which stereoscopic displaying of the parallax images is possible. When the viewpoint position of the user is located in the region WR12, the display device 11 stereoscopically displays the object based on the right and left parallax images. When the viewpoint position of the user is located outside the region WR12, the display device 11 displays one of the right and left parallax images.

As described above, the display is switched between a 3D display and a 2D display in accordance with the viewpoint position of the user, so that a natural image can be presented smoothly to the user.

[Description of a Displaying Operation]

Next, a specific operation of the display device 11 is described.

When a stereoscopic image formed with a parallax image for the right eye and a parallax image for the left eye is designated, and an instruction is issued to display those parallax images by the half-distance display method, the display device 11 performs a displaying operation to stereoscopically display the parallax images. Referring now to the flowchart in FIG. 13, the displaying operation to be performed by the display device 11 is described.

In step S11, the imaging unit 21 captures an image of a region surrounding the display unit 27 as a peripheral image, and supplies the peripheral image to the detecting unit 22.

In step S12, the detecting unit 22 detects the eyes of the user based on the peripheral image supplied, from the imaging unit 21. For example, the detecting unit 22 detects the face of the user from the peripheral image, and further detects the eyes of the user from the area of the detected face.

In step S13, the detecting unit 22 determines whether the eyes of the user have been detected from the peripheral image.

If it is determined in step S13 that the eyes of the user have been detected, the viewpoint position calculating unit 31 in step S14 calculates the viewpoint position of the user from the positions of the detected eyes of the user, and supplies the result to the allocation control unit 23. For example, the viewpoint position calculating unit 31 determines the intermediate position between the right and left eyes of the user in the x-y plane, as the viewpoint position.

In step S15, the determining unit 32 of the allocation control unit 23 determines whether stereoscopic displaying of the parallax images is possible based on the user's viewpoint position supplied from the viewpoint position calculating unit 31.

For example, the determining unit 32 records beforehand the region information for identifying the stereoscopically displayable region WR12 shown in FIG. 12, for example. Based on the recorded region information, a check is made to determine whether stereoscopic displaying is possible by determining whether the viewpoint position of the user is located in the region WR12. Accordingly, when the viewpoint position of the user is located in the region WR12, for example, stereoscopic displaying is determined to be possible.

If it is determined in step S15 that stereoscopic displaying is possible, the viewed position calculating unit 33 in step S16 calculates viewed pixels and viewed positions for each opening portion 81 based on the user's viewpoint position supplied from the viewpoint position calculating unit 31.

Specifically, the viewed position calculating unit 33 performs the calculation described above with reference to FIG. 7, to determine the right-eye position and the left-eye position of the user based on the viewpoint position. By doing so, the viewed position calculating unit 33 calculates the viewed pixels to be viewed via each opening portion 81, and the viewed positions on the viewed pixels at each opening portion 81 (block region). As a result of this, the calculation results shown in FIG. 10 are obtained, for example. That is, in each block region, the channel numbers of the pixels (viewed pixels) to be viewed with the right eye or the left eye of the user, and the positions (viewed positions) on the pixels to be viewed by the user are determined.

In step S17, the boundary position calculating unit 34 calculates boundary positions between serial block regions based on the results of calculations of the viewed pixels and the viewed positions in the respective block regions.

Specifically, the boundary position calculating unit 34 identifies the block regions having the viewed position "0" based on the viewed positions in the respective block regions determined with respect to the right-eye position. In a case where the signs of the viewed positions in the block regions located to the right and left (in the x-direction) of one block region differ from each other, but the channels of the viewed pixels in three block regions are the same, the boundary position calculating unit 34 sets the position of the block region having the viewed position "0" as a boundary position based on the right eye.

Likewise, based on the results of calculations of the viewed pixels and the viewed positions in the respective block regions obtained with respect to the left-eye position, the boundary position calculating unit 34 calculates boundary positions based on the left eye. The boundary position calculating unit 34 then determines eventual boundary positions between serial block regions, each of which is the intermediate position between a boundary position based on the right eye and a boundary position that is based on the left eye and corresponds to the boundary position based on the right eye.

Here, a boundary position that is based on the left eye and corresponds to a boundary position based on the right eye is the boundary position that is based on the left eye and is closest to the boundary position based on the right eye.

Through such calculations, the boundary position LB51 and the boundary position LB52 shown in FIG. 10 are obtained, for example. Depending on the viewpoint position of the user, there might be no boundary positions, as in the example illustrated in FIG. 9.

In step S18, the boundary position calculating unit 34 allocates the parallax image for the right eye or the parallax image for the left eye to the pixels in each block region based on the results of the calculations of the boundary positions between serial block regions.

For example, in the example illustrated in FIG. 9 where no boundary positions exist, the parallax image for the right eye is allocated to the pixels (channel regions) of the channel CH0 and the channel CH1 in all the block regions on the display surface of the optical modulation panel 62. Also, the parallax image for the left eye is allocated to the pixels of the channel CH2 and the channel CH3.

In the example illustrated in FIG. 10, the parallax image for the right eye is allocated to the pixels of the channel CH0 and the channel CH1 in the block regions located between the boundary position LB51 and the boundary position LB52 among the block regions on the display surface of the optical modulation panel 62, for example. Also, the parallax image for the left eye is allocated to the pixels of the channel CH2 and the channel CH3 in the block regions located between the boundary position LB51 and the boundary position LB52.

Figure 14:
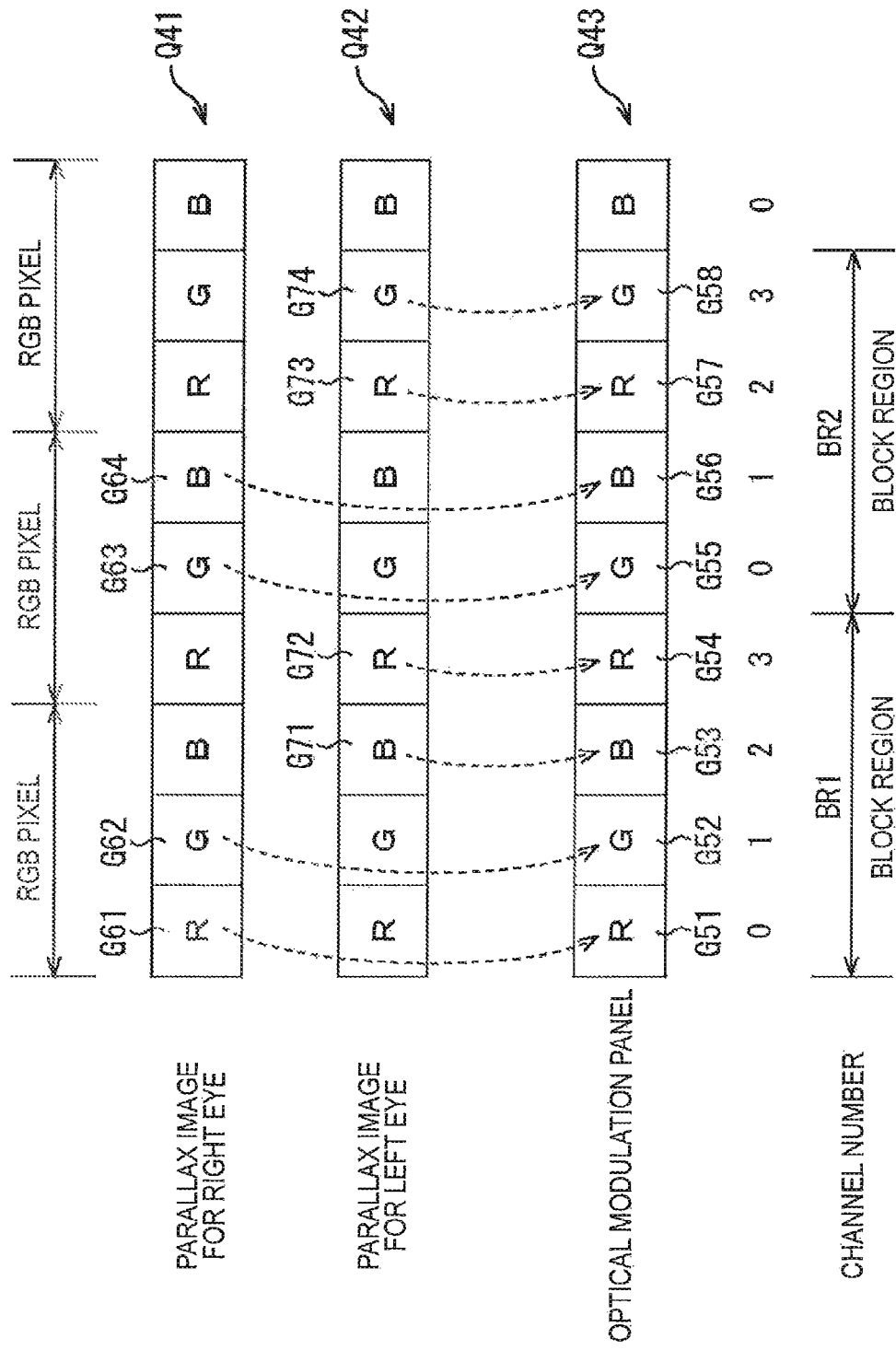
FIG. 14 is a diagram for explaining allocation of parallax images.

More specifically, a block region BR1 and a block region BR2, each of which is formed with four pixels on the optical modulation panel 62, may be set as shown in FIG. 14, for example. In FIG. 14, the horizontal direction is the x-direction.

In FIG. 14, the rectangles indicated by arrows Q41 through Q43 represent the parallax image for the right eye, the parallax image for the left eye, and the optical modulation panel 62. Also, each one square in those rectangles represents one pixel, and the characters "R", "G", and "B" in the respective pixels indicate the colors of the respective pixels.

For example, the region including pixels G51 through G54 on the optical modulation panel 62 is set as the block region BR1, and the region including the pixels G55 through G58 is set as the block region BR2. Here, the pixel G51 is a pixel that has a R (red) color filter and passes only light in R, and the pixel G52 is a pixel that has a G (green) color filter and passes only light in G.

Below the respective pixels on the optical modulation panel 62 in the drawing, the channel numbers of those pixels are shown. For example, the pixel G51 is a pixel of the channel CH0, and the pixel G52 is a pixel of the channel CH1.

Further, in the drawing, the pixels of the parallax images for the right eye and the left eye that are located in the same positions as the respective pixels on the optical modulation panel 62 in the horizontal direction are shown in the same positions as those pixels.

Normally, pixels in an image have the values of the colors R, G, and B. Therefore, a region formed with R, G, and B adjacent to one another is set as one pixel, and the respective color regions of R, G, and B are often regarded as sub pixels.

Specifically, in the parallax image for the right eye in the drawing, the region formed with three serial pixels R, G, and B at the left edge is normally set as one pixel (hereinafter also referred to a RGB pixel where appropriate), and a pixel G61, a pixel G62, and the like of the respective colors are often regarded as sub pixels. However, each of the pixel G61, the pixel G62, and the like is called a pixel herein.

Likewise, the three-color region formed with the pixels G51 through G53 is normally regarded as one pixel, but each of the pixels G51 through G53 is regarded as one pixel herein.

For example, in the block region BR1 and the block region BR2, the boundary position calculating unit 34 may allocate the parallax image for the right eye to the pixels of the channel CH0 and the channel CH1, and allocate the parallax image for the left eye to the pixels of the channel CH2 and the channel CH3.

At this point, the boundary position calculating unit 34 allocates the pixel G61 and the pixel G62 of the parallax image for the right eye to the pixel G51 and the pixel G52 on the optical modulation panel 62, which are located in the same positions as those pixels. The boundary position calculating unit 34 also allocates a pixel G71 and a pixel G72 of the parallax image for the left eye to the pixel G53 and the pixel G54 on the optical modulation panel 62, which are located in the same positions as those pixels.

Likewise, the boundary position calculating unit 34 allocates a pixel G63 and a pixel G64 of the parallax image for the right eye to the pixel G55 and the pixel G56, and allocates a pixel G73 and a pixel G74 of the parallax image for the left eye to the pixel G57 and the pixel G58.

As described above, when the parallax image for the right eye or the left eye is allocated to the pixels of a predetermined channel in a block region, the pixels of the parallax image for the right eye or the left eye that are located in the same positions as the pixels of the predetermined channel are allocated, to the pixels of the predetermined channel.

After allocating the parallax image for the right eye or the left eye to the pixels of each channel in each block region in the above manner, the boundary position calculating unit 34 supplies the allocation result to the generating unit 25, and issues an instruction to generate a combined image.

In step S19, based on the allocation result supplied from the boundary position calculating unit 34, and the parallax images for the right eye and the left eye read from the recording unit 24, the generating unit 25 generates a combined image, and supplies the combined image to the display control unit 26. In a case where the allocation illustrated in FIG. 14 is performed, the generating unit 25 generates a combined image so that the pixel G61 and the pixel G62 of the parallax image for the right eye are displayed on the pixel G51 and the pixel G52, and the pixel G71 and the pixel G72 of the parallax image for the left eye are displayed on the pixel G53 and the pixel G54.

The parallax images may not, be acquired from the recording unit 24, but may be acquired from an external device or be received through communication.

In step S20, the display control unit 26 supplies the combined image supplied from the generating unit 25 to the display unit 27, and causes the display unit 27 to display the combined image.

For example, the display unit 27 causes the backlight 61 to emit light based on the supplied combined image, and controls, for each pixel, the transmission rate of the light from the backlight 61 by applying a voltage to the optical modulation panel 62. The display unit 27 also has a voltage applied to the barrier element 63 to form a parallax barrier including the opening portions 81 and the shielding portions 82.

As a result, the light that has been emitted from the backlight 61 and passed through the respective pixels on the optical modulation panel 62 is optically divided by the parallax barrier. Part of the divided light enters the right eye or the left eye of the user, and the object in the parallax images is stereoscopically viewed by the user. Specifically, the region of the parallax image for the right eye in the combined image is viewed with the right eye of the user, and the region of the parallax image for the left eye in the combined image is viewed with the left eye of the user.

If there is sound accompanying the right and left parallax images, for example, the display device 11 outputs the accompanying sound from a speaker (not shown) in conjunction with the displaying of the combined image.

In step S21, the display device 11 determines whether to switch off the power to the display device 11. When an instruction is issued to switch off the power through a user operation, for example, the power is to be switched off.

If it is determined in step S21 that the power is not to be switched off, the operation returns to step S11, and the above described procedures are repeated. Specifically, the allocation of the parallax images to the pixels of the respective channels in the block regions is changed in accordance with movement of the viewpoint position of the user, and a combined image generated in accordance with the new allocation is displayed.

If it is determined in step S21 that the power is to be switched off, on the other hand, the display device 11 ends the operations of the respective components, and switches off the power. The displaying operation then comes to an end.

If it is determined in step S15 that stereoscopic displaying is not possible, the allocation control unit 23 instructs the generating unit 25 to display a two-dimensional parallax image, and the operation moves on to step S22.

In step S22, the generating unit 25 acquires a two-dimensional parallax image to be displayed, in accordance with the instruction from the allocation control unit 23. Specifically, the generating unit 25 reads one of the parallax images for the right eye and the left eye from the recording unit 24, and supplies the read parallax image directly to the display control unit 26.

The display control unit 26 supplies the parallax image supplied from the generating unit 25 to the display unit 27, and causes the display unit 27 to display the parallax image. At this point, the barrier element 63 does not form a parallax barrier, for example, and the display unit 27 displays the parallax image as it is. Even in a case where a parallax barrier formed in the display unit 27 is of a fixed type, the parallax image is displayed as it is on the display unit 27, and accordingly, the parallax image is two-dimensionally displayed (2D displaying).

After the parallax image is displayed in step S22, the operation moves on to step S21, and the above described procedure is then carried out.

If it is determined in step S13 that the eyes of the user have not been detected, the detecting unit 22 supplies the detection result indicating that the eyes have not been detected to the allocation control unit 23, and the operation moves on to step S23.

In step S23, the allocation control unit 23 determines whether a predetermined period of time has passed since the detection of the eyes of the user failed.

If it is determined in step S23 that the predetermined period of time has not passed yet, the operation moves on to step S22, and the above described procedure is carried out. Specifically, a parallax image is two-dimensionally displayed on the display unit 27.

If it is determined in step S23 that the predetermined period of time has passed, on the other hand, the allocation control unit 23 in step S24 controls the generating unit 25 so that no images are displayed. Under the control of the allocation control unit 23, the generating unit 25 stops supplying images to the display control unit 26. As a result, any image is not displayed on the display unit 27. That is, displaying is stopped.

In a case where there is sound accompanying the parallax image, only the sound may be reproduced while displaying is stopped, or the sound may also be switched off. As described above, in a case where the eyes of the user are not detected over a predetermined period of time, the user should not be viewing the parallax image, and the power consumption can be reduced by stopping displaying.

After displaying is stopped in step S24, the operation moves on to step S21, and the above described procedure is carried out. The displaying operation then comes to an end.

In the above described manner, the display device 11 calculates viewed pixels and viewed positions in each block region based on the viewpoint position of the user, and allocates the parallax image for the right eye or the left eye to the pixels of each channel in the block regions based on the calculation result. A combined image is thus generated.

At this point, the parallax image of the same viewpoint is allocated to at least two pixels adjacent to each other in the x-direction in a block region, so that occurrence of crosstalk can be more readily prevented, and images with higher quality can be presented.

Also, the allocation of parallax images to the pixels of the respective channels in the block regions is changed in accordance with movement of the viewpoint position of the user, so that a more natural and high-quality image can be presented while the user does not notice the switching of parallax images being displayed through the respective channels.

Further, in the display device 11, when the user views the display unit 27 from a region where stereoscopic displaying is possible, viewed positions are almost the same positions among the respective block regions. Accordingly, uniform luminance is achieved in the entire image being displayed, and moires do not appear.

Furthermore, the display device 11 is designed so that viewed positions in the respective block regions become almost the same positions when the viewpoint position of the user is located at a distance that is almost the half of the proper viewing distance. Accordingly, the number of boundary positions between serial block regions can be reduced.

For example, when a conventional display device for four viewpoints is viewed from a distance that is half the proper viewing distance, pixels of different channels are viewed depending on block regions, and the number of boundary positions between serial block regions is 4 or greater. In the display device 11, on the other hand, the number of boundary positions is 3 or smaller, and display control on parallax images can be more easily performed.

In the above, described displaying operation, the determining unit 32 records beforehand the region information for identifying a region where stereoscopic displaying is possible. However, such region information may not be recorded in advance, and a check may be made to determine whether stereoscopic displaying is possible based on the results of calculations of viewed pixels.

In such a case, the determining unit 32 uses the results of the calculations of viewed pixels in the respective block regions, which have been performed by the viewed position calculating unit 33. That is, when there is a block region in which the viewed pixel based on the right eye and the viewed pixel based on the left eye are pixels of the same channel, the determining unit 32 determines that stereoscopic displaying is not possible.

<Modification 1>

In the above description, the display device 11 alone performs stereoscopic displaying by the half-distance display method. However, stereoscopic displaying by the half-distance display method may be performed by a display system formed with a few devices.

Figure 15:
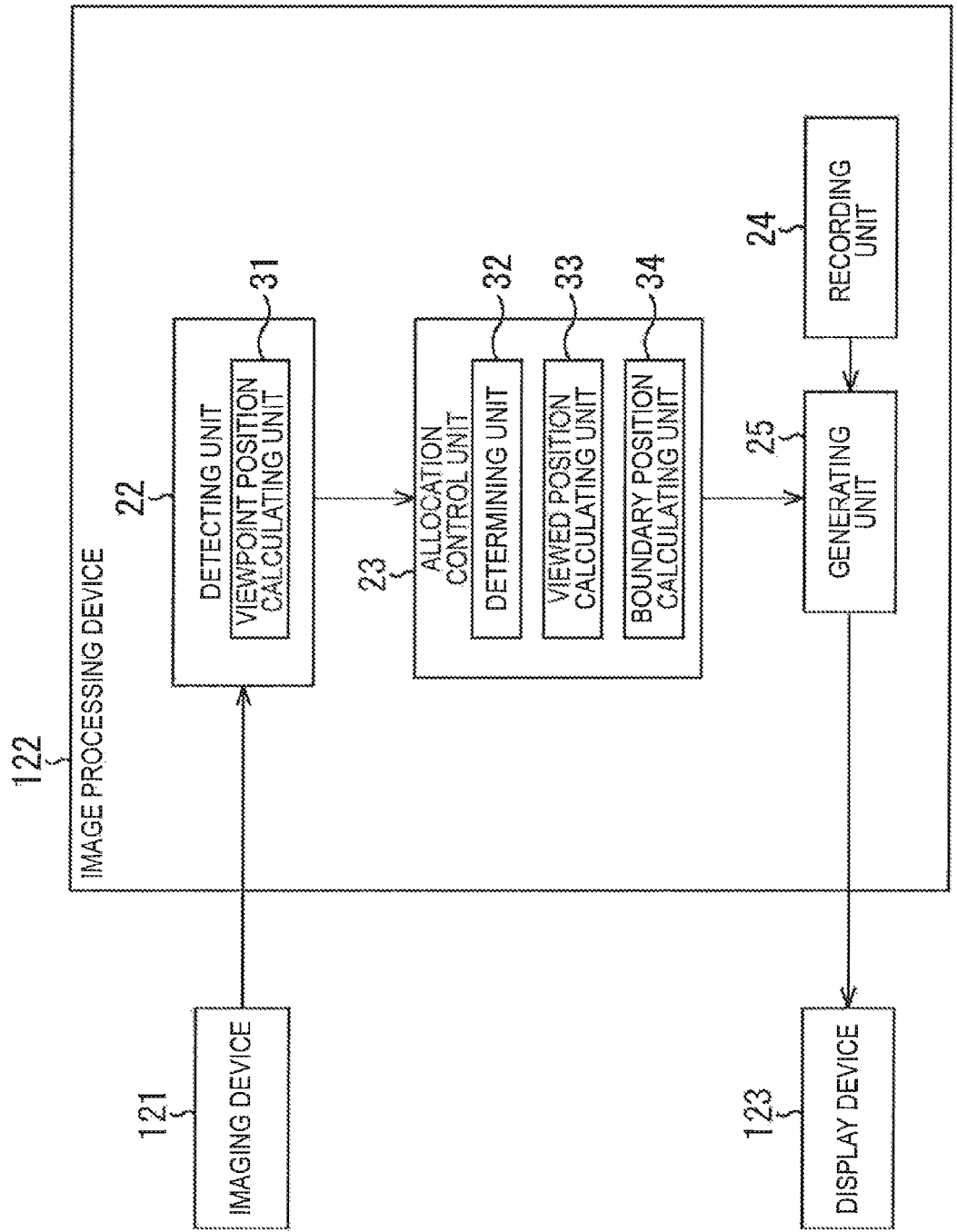
FIG. 15 is a diagram showing an example structure of a display system.

In such a case, the display system has a structure shown in FIG. 15, for example.

Specifically, the display system shown in FIG. 15 is formed with an imaging device 121, an image processing device 122, and a display device 123. In FIG. 15, the components equivalent to the components shown in FIG. 1 are denoted by the same reference numerals as those used in FIG. 1, and explanation of them is not repeated herein.

The imaging device 121 captures an image of the surroundings of the display device 123 as a peripheral image, and supplies the peripheral image to the image processing device 122. The image processing device 122 generates a combined image by using the peripheral image supplied from the imaging device 121, and supplies the combined image to the display device 123.

The image processing device 122 is formed with a detecting unit 22, an allocation control unit 23, a recording unit 24, and a generating unit 25. The detecting unit 22 detects the eyes of the user from the peripheral image supplied from the imaging device 121, and supplies the detection result to the allocation control unit 23. Based on the detection result supplied from the detecting unit 22, the allocation control unit 23 allocates parallax images to the pixels of the respective channels in the block regions.

Under the control of the allocation control unit 23, the generating unit 25 generates a combined image from the parallax images for the right and left eyes recorded in the recording unit 24, and supplies the combined image to the display device 123.

The display device 123 is a display device that has the same functions as those of the display unit 27 and the display control unit 26, for example, and can display a stereoscopic image. Based on the combined image supplied from the generating unit 25, the display device 123 stereoscopically displays the object in the parallax images.

<Modification 2>

Further, in the above description, the display unit 27 has been described as a display device that can stereoscopically display parallax images of four viewpoints. However, the display unit 27 may be a display device that can stereoscopically display parallax images of five or more viewpoints.

Figure 16:
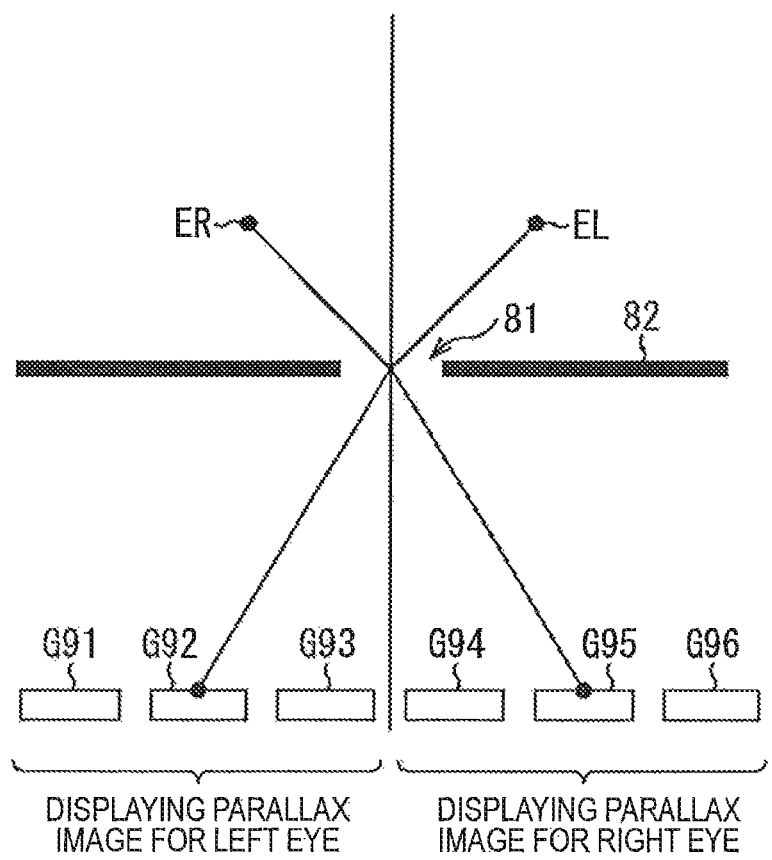
FIG. 16 is a diagram for explaining allocation of parallax images at a display unit for six viewpoints.

In a case where the display unit 27 can stereoscopically display parallax images of six viewpoints, for example, a region formed with pixels of six different channels is set as a block region, and one opening portion 81 is provided for the block region, as shown in FIG. 16. In FIG. 16, the components equivalent to the components shown in FIG. 2 are denoted by the same reference numerals as those used in FIG. 2, and explanation of them is not repeated herein.

In the example illustrated in FIG. 16, a region including pixels G91 through G96 of six different channels is set as one block region.

In this case, a user's viewpoint position from which the parallax images cart be stereoscopically viewed is such a position that pixels located three pixels apart from each other become viewed pixels that are based on the right eye and the left eye of the user, for example. In the example illustrated in FIG. 16, the pixel G95 is viewed with the right eye ER of the user, and the pixel G92 is viewed with the left eye EL of the user.

At the time of allocation of parallax images, the parallax image for the right eye or the left eye is allocated to the pixels of at least three serial channels. For example, the parallax image for the left eye is allocated to the pixels G91 through G93 in FIG. 16, and the parallax image for the right eye is allocated to the pixels G94 through G96.

As described above, at the display unit that can stereoscopically display parallax images of viewpoints, the viewed pixels of the right eye and the left eye are pixels two or more pixels apart from each other. With this arrangement, a parallax image of the same viewpoint can be allocated to two or more pixels aligned in the parallax direction. Accordingly, occurrence of crosstalk can be easily prevented, and parallax images with higher quality can be presented.

In the above description, almost the same positions in the respective block regions are viewed with the eyes of the user viewing the display device 11. Accordingly, uniform luminance is achieved on the entire display surface of the optical modulation panel 62, and moires do not appear, as described above.

However, if the opening width of each opening portion 81 is too small, the screen is bright when the centers of the pixels are viewed by the user, but the screen is dark when positions between the pixels are viewed by the user. In such a case, as the user moves the viewpoint position in the x-direction, the screen alternates between a bright state and a dark state in predetermined cycles.

To prevent such cycles of a bright state and a dark state, the opening width of each opening portion 81 needs to be appropriately set, and the opening width may be made equal to the pixel width or the inter-pixel distance, for example. Alternatively, the opening width may be set at a value that is obtained by subtracting the pixel width from the value equivalent to twice the inter-pixel distance.

Second Embodiment

[Occurrence and Reduction of Crosstalk]

Where a stereoscopic image is displayed by the above described half-distance display method, occurrence of crosstalk can be prevented, and high-quality images can be presented. However, a small amount of crosstalk does occur with the half-distance display method.

Figure 17:
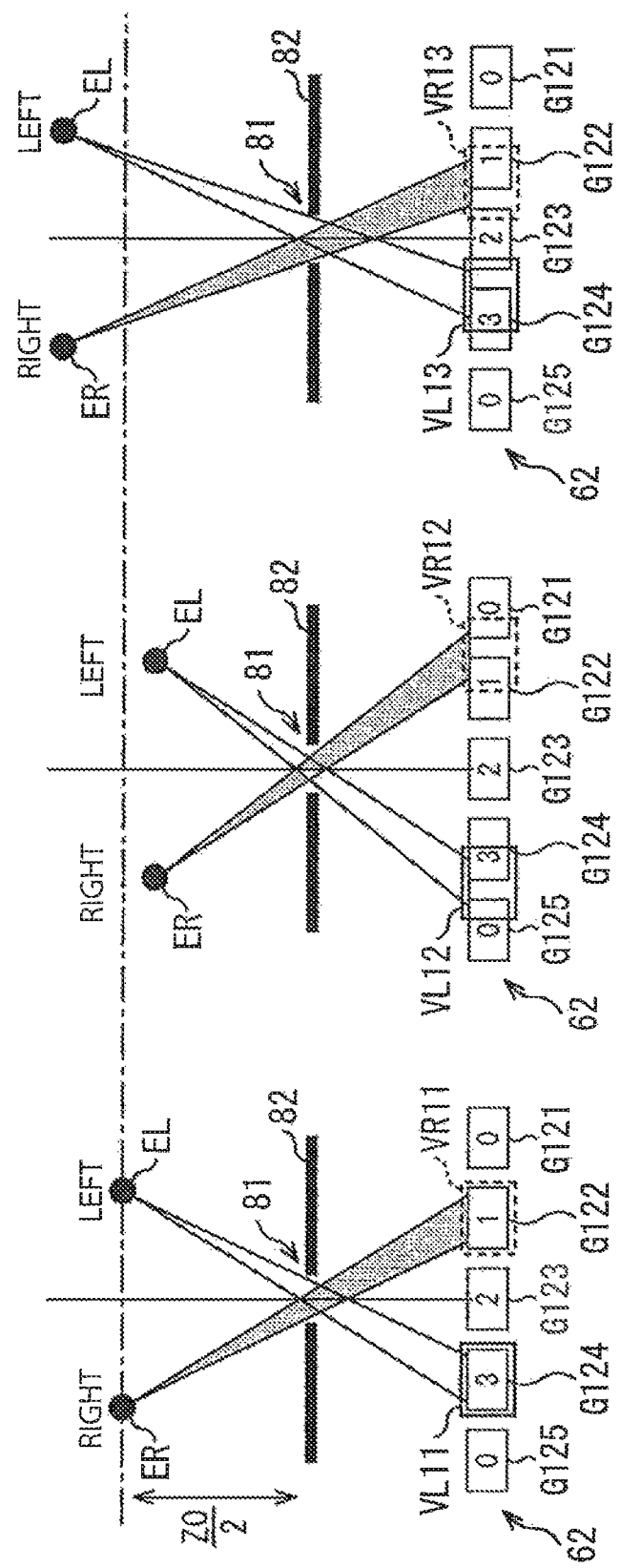
FIG. 17 is a diagram for explaining occurrence of crosstalk by the half-distance display method.

For example, as shown in the left side in FIG. 17, the user may be viewing pixels on the optical modulation panel 62 via an opening portion 81 when both eyes of the user are located at a distance Z0/2 in the y-direction from the display unit 27, with the distance Z0/2 being half the proper viewing distance (hereinafter also referred to as the half proper viewing distance). In FIG. 17, the horizontal direction and the vertical direction are the x-direction and the y-direction, respectively.

In FIG. 17, five pixels G121 through G125 are aligned in the x-direction on the optical modulation panel 62, and those pixels G121 through G125 are pixels of the channels CH0, CH1, CH2, CH3, and CH0, respectively. The numbers in the respective pixels show the channel numbers of those pixels.

In the example shown in the left side in the drawing, the right eye ER and the left eye EL of the user are located at the half proper viewing distance from the display unit 27, and a region VR11 and a region VL11 on the optical modulation panel 62 are viewed with the right eye ER and the left eye EL of the user, respectively.

The region VR11 is substantially the region of the pixel G122, and the region VL11 is substantially the region of the pixel G124. Accordingly, almost the center regions of the pixel G122 and the pixel G124 are viewed with the right eye ER and the left eye EL of the user. Thus, crosstalk does not occur in this situation.

Meanwhile, when the viewpoint position of the user becomes closer to the display unit 27 than to the position at the half proper viewing distance in the situation illustrated in the left side in the drawing, the region being viewed by the user on the optical modulation panel 62 changes as shown in the center portion in the drawing. Specifically, the region VR12 being viewed with the right eye ER of the user in this example is a region including part of the pixel G121 and part of the pixel G122, and the region VL12 being viewed with the left eye EL of the user is a region including part of the pixel G124 and part of the pixel G125.

Therefore, both the right eye and the left eye of the user see a pixel of the channel CH0, and crosstalk occurs.

When the viewpoint position of the user becomes further away from the display unit 27 than from the position at the half proper viewing distance in the situation illustrated in the left side in the drawing, the region being viewed by the user on the optical modulation panel 62 changes shown in the right side in the drawing. Specifically, the region VR13 being viewed with the right eye ER of the user in this example is a region including part of the pixel G122 and part of the pixel G123, and the region VL13 being viewed with the left eye EL of the user is a region including part of the pixel G123 and part of the pixel G124.

Therefore, both the right eye and the left eye of the user see a pixel of the channel CH2, and crosstalk occurs.

Figure 18:
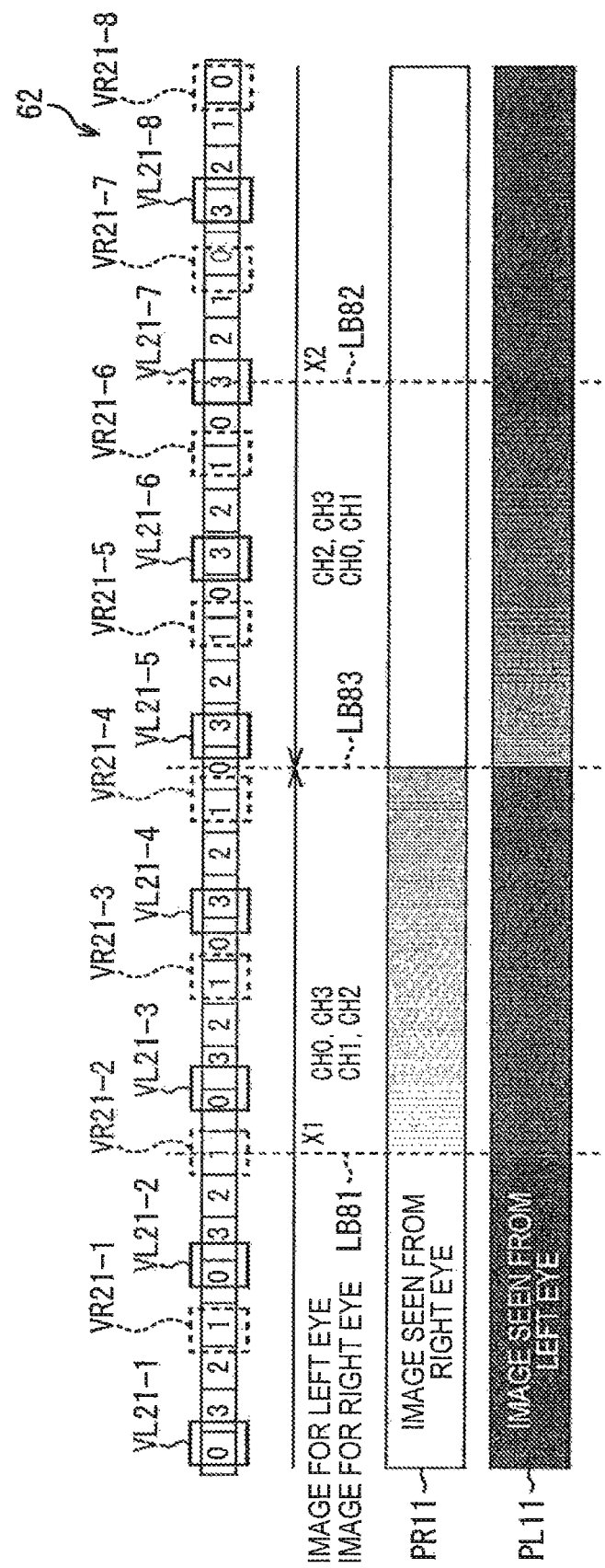
FIG. 18 is a diagram for explaining occurrence of crosstalk by the half-distance display method.

More specifically, crosstalk due to a change in the viewing distance of the user occurs in the vicinity of a boundary position between serial block regions, as shown in FIG. 18. FIG. 18 shows an example case where the viewpoint position of the user is closer to the display unit 27 than to the position at the half proper viewing distance. The horizontal direction in the drawing is the x-direction, and each one square in the drawing represents one pixel provided on the optical modulation panel 62. Further, the numbers shown in those pixels are the channel numbers of the respective pixels.

In FIG. 18, respective regions VR21-1 through VR21-8 represent the regions on the optical modulation panel 62 to be viewed with the right eye ER of the user via the respective opening portions 81. Also, respective regions VL21-1 through VL21-8 represent the regions on the optical modulation panel 62 to be viewed with the left eye EL of the user via the respective opening portions 81.

Hereinafter, the regions VR21-1 through VR21-8 will be also referred to simply as the regions VR21 when there is no particular need to distinguish those regions from one another, and the regions VL21-1 through VL21-8 will be also referred to simply as the regions VL21 when there is no particular need to distinguish those regions from one another.

By the half-distance display method, when the boundary position between serial block regions based on the right eye differs from the boundary position between serial block regions based on the left eye, the intermediate position between those boundary positions is set as the eventual boundary position, and right and left parallax images are allocated.

For example, in FIG. 18, a straight line LB81 and a straight line LB82 represent the boundary position based on the right eye and the boundary position based on the left eye, respectively, and those boundary positions are different positions. Therefore, the position of a straight line LB83 located in the intermediate position between the straight line LB81 and the straight line LB82 is set as the eventual boundary position between the serial block regions.

In this case, in the region to the left of the straight line LB83 in the drawing, the parallax image for the left eye is allocated to the pixels of the channel CH0 and the channel CH3, and the parallax image for the right eye is allocated to the pixels of the channel CH1 and the channel CH2.

Also, in the region to the right of the straight line LB83 in the drawing, the parallax image for the left eye is allocated to the pixels of the channel CH2 and the channel CH3, and the parallax image for the right eye is allocated to the pixels of the channel CH0 and the channel CH1.

When such allocation of parallax images is performed, the parallax image for the right eye may be displayed as a white image, and the parallax image for the left eye may be displayed as a black image, for example.

Attention is now directed to the region between the position of the straight line LB83 as the boundary position between the serial block regions and the position of the straight line LB81 as the boundary position based on the right eye. The regions VR21 located in this region include pixel regions of the channel CH1 and the channel CH0.

Specifically, more than half the regions of the pixels of the channel CH1 in this region are viewed with the right eye of the user. Accordingly, the viewed pixels based on the right eye of the user are the pixels of the channel CH1. However, not only pixels of the channel CH1 but also partial regions of pixels of the channel CH0 are viewed with the right eye of the user.

In the region between the straight line LB83 and the straight line LB81, however, the parallax image for the left eye is allocated to the pixels of the channel CH0. Therefore, in this region, the right eye of the user sees leakage of the parallax image for the left eye. That is, crosstalk occurs in the right eye of the user.

As a result, the image PR11 perceived by the right eye of the user is an image that is grayish at the portion corresponding to the region between the straight line LB83 and the straight line LB81. Particularly, on the left side of the straight line LB83 as the boundary position in the drawing, the amount of crosstalk is larger in a region closer to the straight line LB83. However, no crosstalk occurs on the right side of the straight line LB83 in the drawing. As a result, linear crosstalk that is long in the z-direction occurs in the image PR11, and the crosstalk is somewhat conspicuous.

Likewise, attention is now directed to the region between the position of the straight line LB83 as the boundary position between the serial block regions and the position of the straight line LB82 as the boundary position based on the left eye. The regions VL21 located in this region include pixel ions of the channel CH0 and the channel CH3.

In the region between the straight line LB83 and the straight line LB82, however, the parallax image for the right eye is allocated to the pixels of the channel CH0. Therefore, in this region, the left eye of the user sees leakage of the parallax image for the right eye.

As a result, the image PL11 perceived by the left eye of the user is an image that is whitish at the portion corresponding to the region between the straight line LB83 and the straight line LB82. Particularly, on the right side of the straight line LB83 as the boundary position in the drawing, the amount of crosstalk is larger in a region closer to the straight line LB83. However, no crosstalk occurs on the left side of the straight line LB83 in the drawing. As a result, linear crosstalk that is long in the z-direction also occurs in the image PL11.

As described above, in the region between the straight line LB81 and the straight line LB82, pixel regions of the channel CH0 are viewed with the right and left eyes of the user, and as a result, crosstalk occurs, regardless of how the right and left parallax images are allocated. Where the parallax images are allocated by using one of the positions of the straight line LB81 and the straight line LB82 as the boundary position between serial block regions, almost no crosstalk occurs in one of the right and left eyes, but a large amount of crosstalk occurs in the other eye.

In view of this, to further reduce crosstalk with the half-distance display method, the right and left parallax images may be blended and be then displayed on the pixels to be the cause of crosstalk or on the pixels to be viewed with both the right eye and the left eye.

Figure 19:
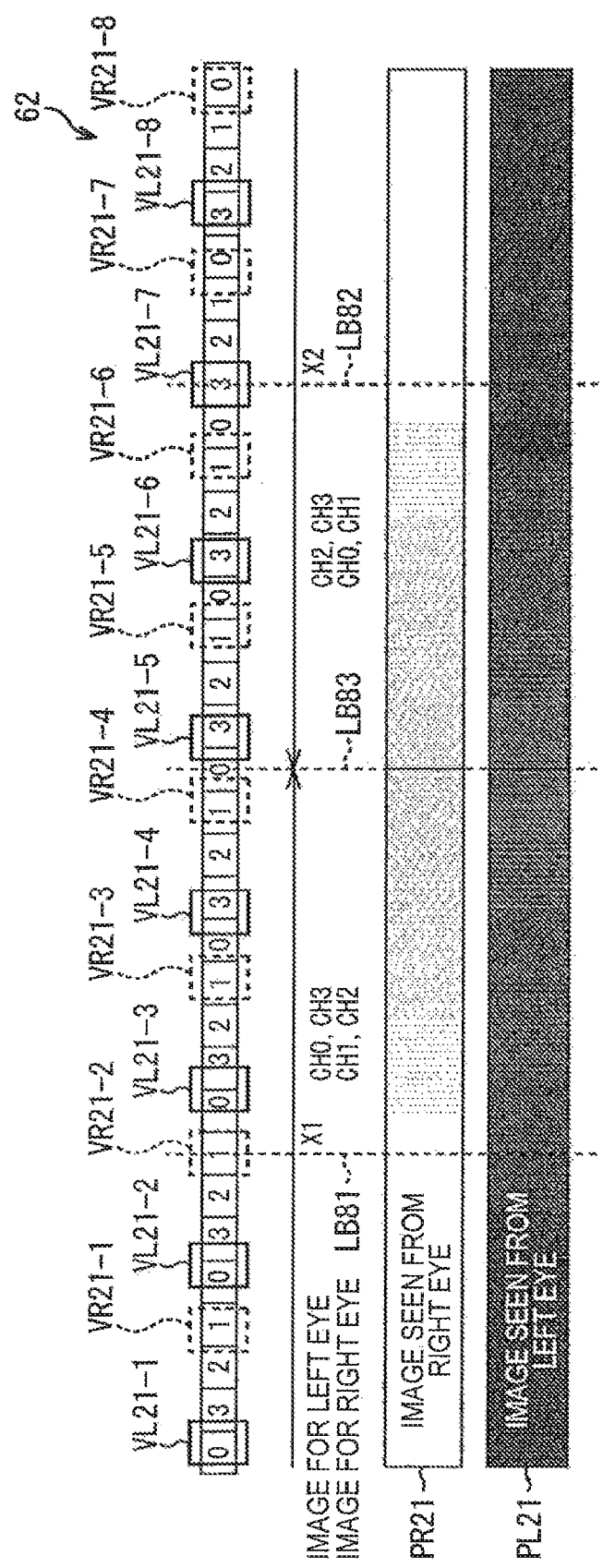
FIG. 19 is a diagram for explaining a reduction of crosstalk by the half-distance display method.

For example, the pixels to be the cause of crosstalk exist in the region between the straight line LB81 as the boundary position based on the right eye and the straight line LB82 as the boundary position based on the left eye, as shown in FIG. 19. In FIG. 19, the components equivalent to the components shown in FIG. 18 are denoted by the same reference numerals as those used in FIG. 18, and explanation of them is not repeated herein.

In the example illustrated in FIG. 19, the pixels of the channel CH0 existing in the region between the straight line LB81 and the straight line LB82 are viewed with both eyes of the user, and cause crosstalk, as described above with reference to FIG. 18.

In view of this, an image with a pixel value obtained by blending the pixel values of the pixels of the right and left parallax images at a blend ratio in accordance with the amount (the amount of leakage) leaking as crosstalk from the pixels of the channel CH0 existing in the region between the straight line LB81 and the straight line LB82 is displayed on those pixels.

For example, in the position of the straight line LB83, or at the pixel of the channel CH0 located in the boundary position, light (the image) leaks from the pixel into the region VR21-4 and the region VL21-5, and results in crosstalk. The amount of leakage is the same in both of the regions. In view of this, an image with a pixel value obtained by blending the pixel values of the corresponding pixels of the right and left parallax images at equal rate is displayed on the pixel of the channel CH0 located in the boundary position.

At the pixel of the channel CH0 that is adjacent to and is located on the right side of the straight line LB81 in the drawing, the light from the pixel leaks into the region VR21-2 and the region VR21-3, and results in crosstalk. Here, the amount of leakage into the region VR21-3 or to the left eye is larger. In view of this, an image with a pixel value obtained by blending the pixels of the parallax image for the left eye at a higher rate among the corresponding pixels of the right and left parallax images is displayed on the pixel of the channel CH0 that is adjacent to and is located on the right side of the straight line LB81.

At the pixel of the channel CH0 that is adjacent to and is located on the left side of the straight line LB82 in the drawing, on the other hand, the light from the pixel leaks into the region VR21-6 and the region VL21-7, and results in crosstalk. Here, the amount of leakage into the region VR21-6 or to the right eye is larger than the amount of leakage to the left eye. In view of this, an image with a pixel value obtained by blending the pixels of the parallax image for the right eye at a higher rate among the corresponding pixels of the right and left parallax images is displayed on the pixel of the channel CH0 that is adjacent to and is located on the left side of the straight line LB82.

Where the above described facts are generalized, an image with a pixel value Out(X) determined according to the following equation (1) should be displayed on the pixels to be the cause of crosstalk occurrence.

$$\text{Out}(X)=(R(X)\times(X-X1)+L(X)\times(X2-X))/(X2-X1) \qquad (1)$$

In the equation (1), the variable X represents the position of a pixel on the optical modulation panel 62 in the coordinate system having the direction toward the right (the −x-direction) as the +X-axis direction in the drawing, with the origin being the Position of the left edge of the optical modulation panel 62 in the drawing or the position of the edge in the +x-direction.

R(X) and L(X) represent the pixel values of the pixels of the parallax images for the right eye and the left eye in the position X, respectively, and X1 and X2 represent the boundary position based on the right eye and the boundary position based on the left eye, respectively. For example, the position of the straight line LB81 is the position X=X1, and the position of the straight line LB82 is the position X=X2.

Accordingly, the pixel value Out(X) of the pixel in the position X in the combined image to be displayed on the pixel of the channel to be viewed with both eyes of the user is determined by a calculation according to the equation (1), with the position X being located between the position X1 and the position X2. The pixel value Out(X) is determined by calculating a weighted average between the pixel value of the pixel of the parallax image for the left eye in the position X and the pixel value of the pixel of the parallax image for the right eye in the position X, with the weight being the ratio between the amount of light leaking from the pixel in the position X to the right eye and the amount of light leaking from the pixel in the position X to the left eye.

The ratio (the blend ratio) between the amount of light leaking from the pixel in the position X to the right eye and the amount of light leaking from the pixel in the position X to the left eye is determined from the positional relationship between the position X and the positions X1 and X2, or from the position of the target pixel in the region where blending should be performed. In other words, the blend ratio is the ratio in size between the pixel region to be viewed with the right eye and the pixel region to be viewed with the left eye of the user. For example, in the position X closer to the position X1, the amount of light leaking from the pixel of the channel CH0 to the left eye is larger, and accordingly, the parallax image for the left eye is blended at a higher rate.

Where blending is performed in accordance with the amount of light leaking as crosstalk, and a combined image obtained as a result of the blending is displayed, an image PR21 is perceived by the right eye ER of the user, and an image PL21 is perceived by the left eye EL of the user.

The combined image displayed at this point is an image obtained by replacing part of the white image as the parallax image for the right eye and part of the black image as the parallax image for the left eye with an image obtained by performing the blending.

In the image PR21 and the image PL21, a small amount of crosstalk occurs on the right and left sides of the straight line LB83, but the crosstalk is scattered to the right and the left of the straight line LB83 by the blending of the parallax images. Accordingly, the crosstalk is not as conspicuous as the crosstalk in the image PR11 and the image PL11. Although the area in which the crosstalk occurs is larger, the amount of leakage in each region is smaller. Accordingly, degradation of the image quality of a stereoscopic image due to occurrence of crosstalk is reduced.

As for light from the pixel of the channel CH0 located in the position of the straight line LB83, for example the amount of leakage to the right eye of the user is substantially the same as the amount of leakage to the left eye of the user. In view of this, the pixels of the combined image to be displayed on this pixel are made to include the same amounts of the right and left parallax images. In this manner, the amounts of crosstalk in the right eye and the left eye are made smaller than in a case where the pixels of the combined image include pixels of only one of the parallax images.

Figure 20:
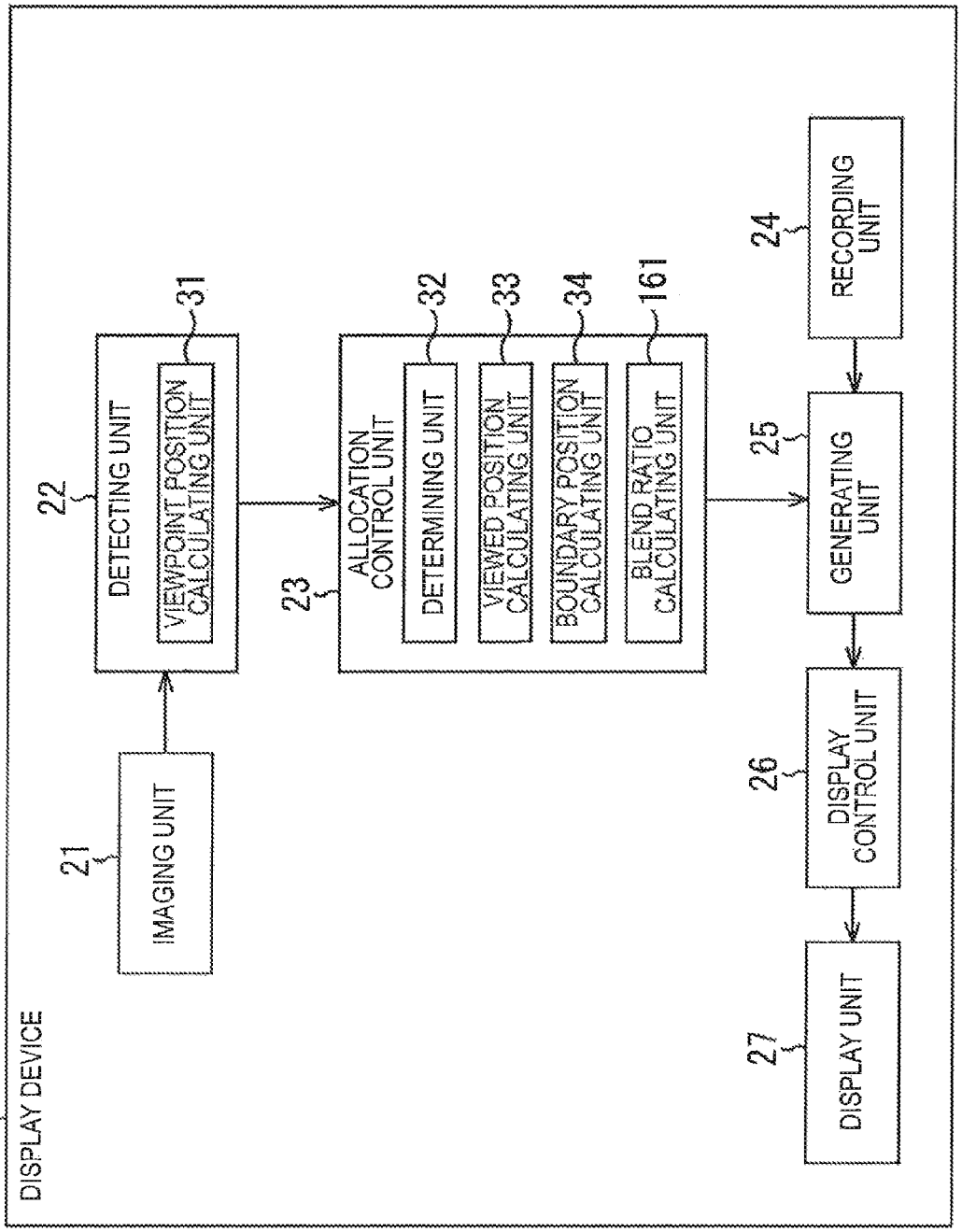
FIG. 20 is a diagram showing another example structure of a display device.

[Example Structure of a Display Device]

Where parallax images are blended for the pixels to be the cause of occurrence of crosstalk in the above described manner, the display device is designed as shown in FIG. 20, for example.

The display device 151 shown in FIG. 20 includes an imaging unit 21, a detecting unit 22, an allocation control unit 23, a recording unit 24, a generating unit 25, a display control unit 26, and a display unit 27. In FIG. 20, the components equivalent to the components shown in FIG. 1 are denoted by the same reference numerals as those used in FIG. 1, and explanation of them is not repeated herein.

The display device 151 shown in FIG. 20 has the same structure as the display device 11 shown in FIG. 1, except that a blend ratio calculating unit 161 is provided in the allocation control unit 23 of the display device 151.

In a case where a stereoscopic image is to be displayed by the half-distance display method, when the optical modulation panel 62 has a pixel of a channel for which blending should be performed, the blend ratio calculating unit 161 calculates the blend ratio between the parallax images at the pixel of the channel. Hereinafter, the channel of a pixel for which blending should be performed will be also referred to as the target channel.

In a case where a combined image is to be generated from parallax images read from the recording unit 24, when there is a region in which blending should be performed, the generating unit 25 generates the combined image by performing blending for the pixel of the target channel in the region based on the blend ratio calculated by the blend ratio calculating unit 161.

[Description of a Displaying Operation]

Figure 21:
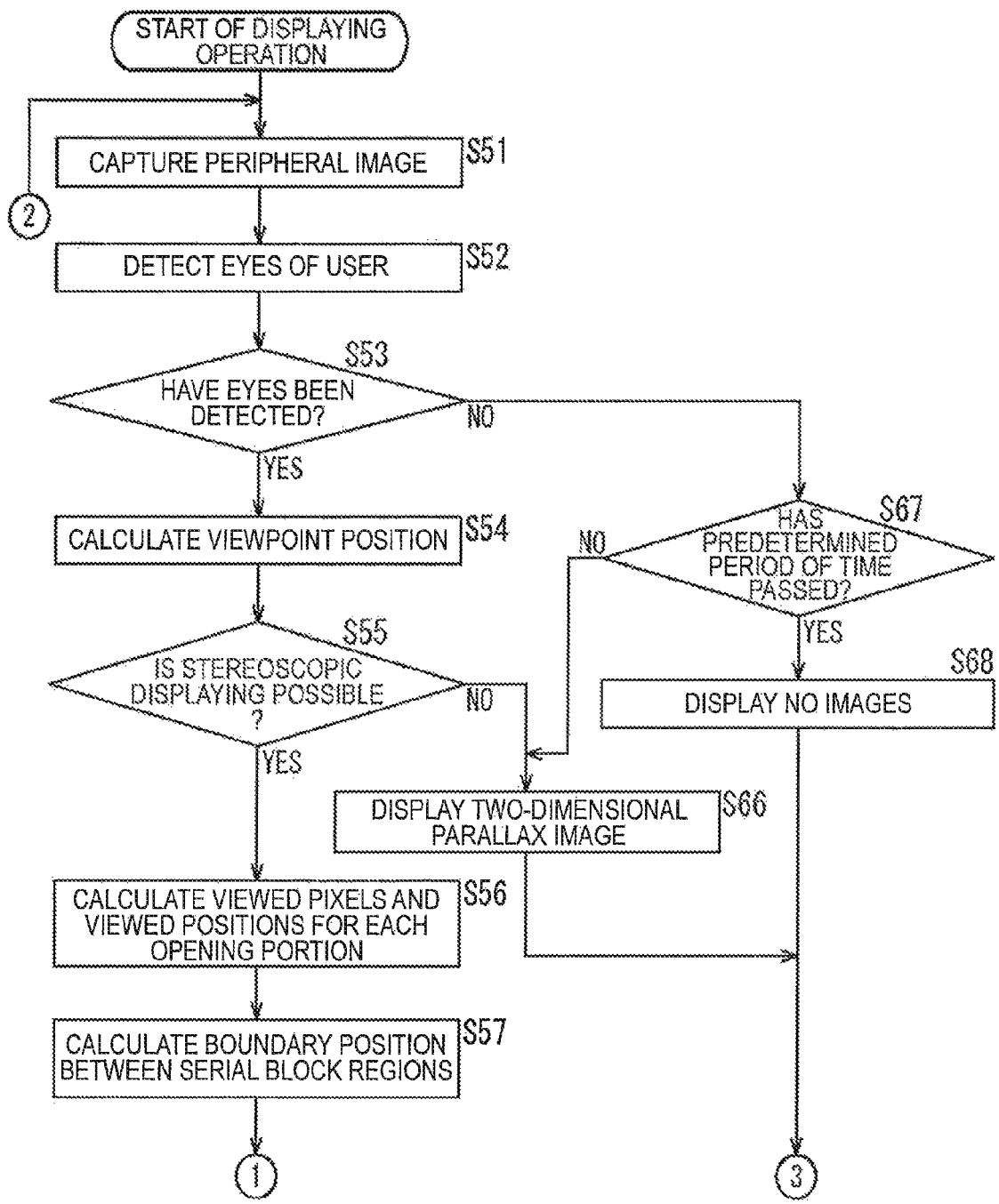
FIG. 21 is a flowchart for explaining a displaying operation.
Figure 22:
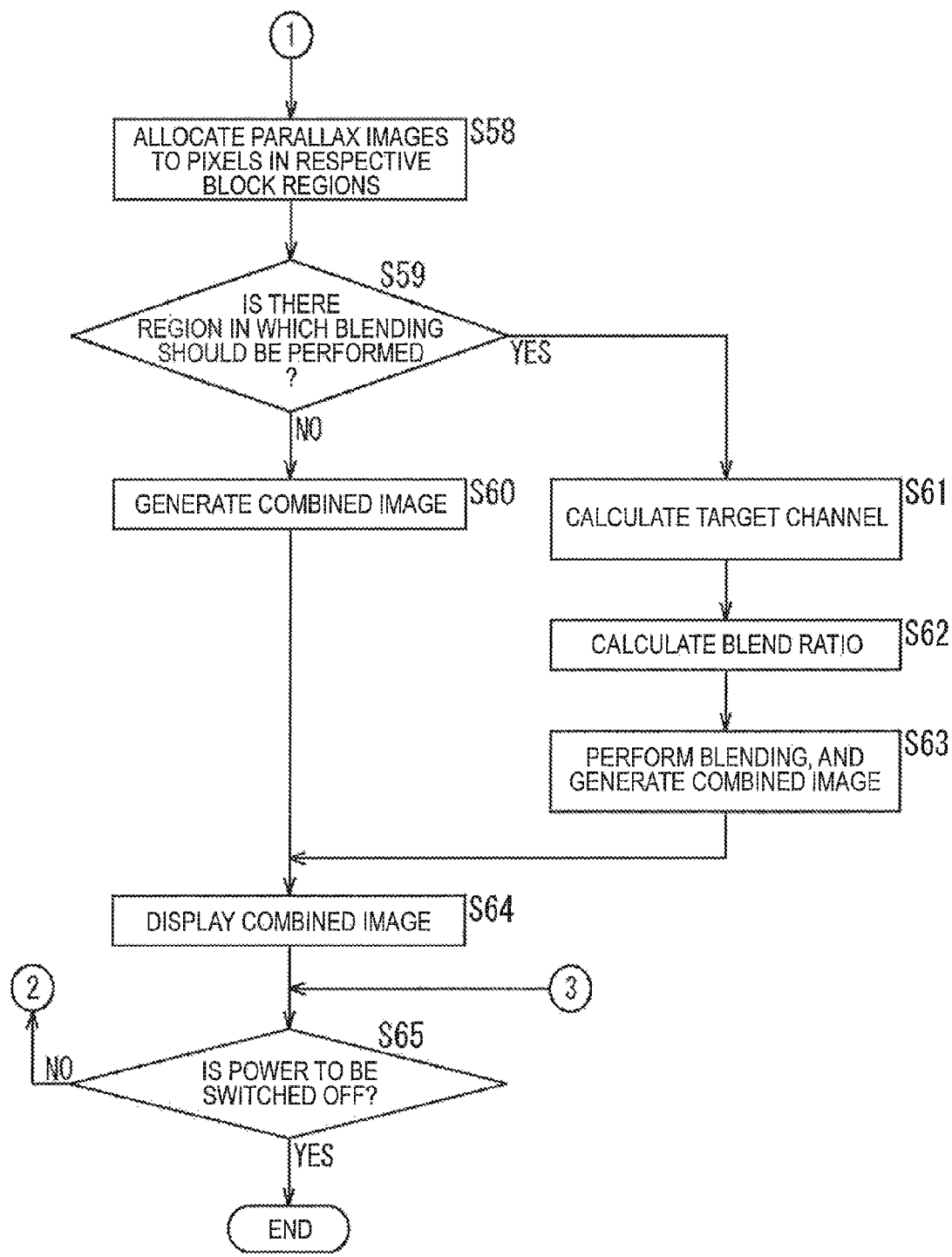
FIG. 22 is a flowchart for explaining the displaying operation.

Referring now to the flowcharts in FIGS. 21 and 22, a displaying operation to be performed by the display device 151 is described.

Figure 13:
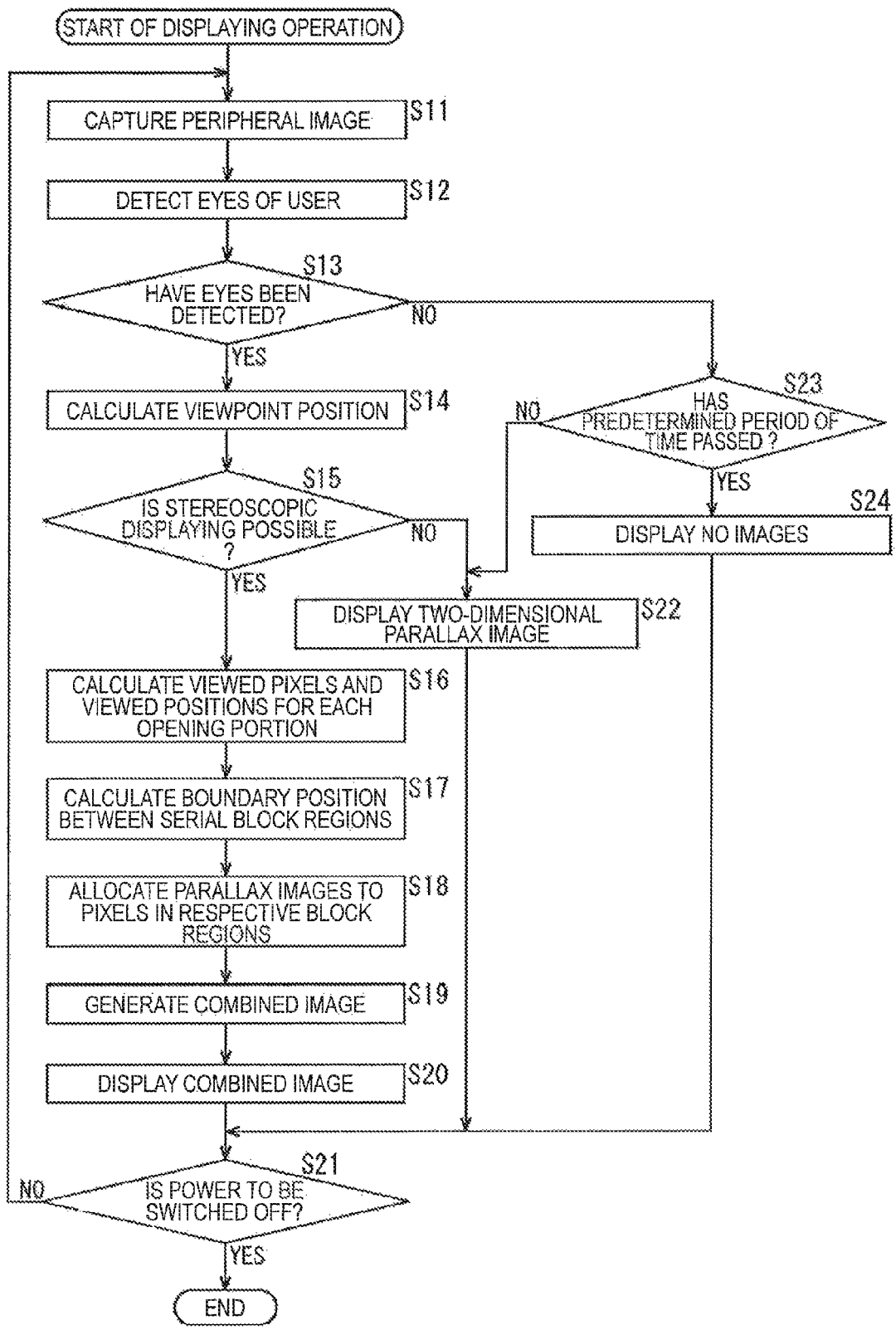
FIG. 13 is a flowchart for explaining a displaying operation.

The procedures in steps S51 through S58 are the same as the procedures in steps S11 through S18 in FIG. 13, and therefore, explanation of them is not repeated herein. In the procedures in steps S51 through S58, the parallax image for the right eye or the parallax image for the left eye is allocated to the pixel of each channel in each block region.

In step S59, the blend ratio calculating unit 161 determines whether there is a region in which blending should be performed.

For example, in a case where the boundary position based on the right eye that has been calculated through the procedure in step S57 differs from the boundary position based on the left eye, it is determined that there is a region in which blending should be performed. At this point, the region between the boundary position based on the right eye and the boundary position based on the left eye is set as the region in which blending should be performed.

If it is determined in step S59 that there are no regions in which blending should be performed, the boundary position calculating unit 34 supplies the result of allocation of the right and left parallax images to the pixels of the respective channels to the generating unit 25. The operation then moves on to step S60.

In step S60, based on the allocation result supplied from the boundary position calculating unit 34, and the parallax images for the right eye and the left eye read from the recording unit 24, the generating unit 25 generates a combined image, and supplies the combined image to the display control unit 26. In this step S60, the same procedure as that in step S19 in FIG. 13 is carried out. After the procedure in step S60 is carried out, the operation moves on to step S64.

If it is determined in step S59 that there is a region in which blending should be performed, on the other hand, the blend ratio calculating unit 161 in step S61 calculates a target channel for which blending should be performed.

For example, the blend ratio calculating unit 161 determines a target channel that is the channel of the pixel to be viewed with the right and left eyes of the user among the respective pixels located in the region between the boundary position based on the right eye and the boundary position based on the left eye.

The target channel can be determined from the viewed positions of the viewed pixels located in the region between the boundary position based on the right eye and the boundary position based on the left eye.

For example, the region between the straight line LB41 and the straight line LB31 shown in FIG. 10 is a region in which blending should be performed. In this region, the pixel to be viewed with the right eye is of the channel CH0, but the polygonal line C31 shows that the viewed position of the viewed pixel is a negative position. Therefore, the right eye of the user views not only the pixel of the channel CH0 but also a pixel of the channel CH3.

Likewise, in this region, the pixel to be viewed with the left eye is of the channel CH2, but the polygonal line C34 shows that the viewed position of the viewed pixel is a positive position. Therefore, the left eye of the user views not only the pixel of the channel CH2 but also a pixel of the channel CH3. Accordingly, the channel CH3 is identified as the target channel in this case.

In step S62, the blend ratio calculating unit 161 calculates a blend ratio according to the above described equation (1) for each pixel of the target channel in the region in which blending should be performed. For example, where the position of the pixel of the target channel to be processed is a position X, the blend ratio of the parallax image for the left eye is expressed as (X2−X)/(X2−X1), and the blend ratio of the parallax image for the right eye is expressed as (X−X1)/(X2−X1). Here, X1 and X2 represent the boundary position based on the right eye and the boundary position based on the left eye, respectively.

After calculating the blend ratios, the blend ratio calculating unit 161 supplies the calculated blend ratios and the result of allocation of the right and left parallax images to the pixels of the respective channels to the generating unit 25. The operation then moves on to step S63.

In step S63, the generating unit 25 generates a combined image by performing a blending operation based on the blend ratios supplied from the blend ratio calculating unit 161, the result of allocation of the parallax images, and the parallax images for the right eye and the left eye read from the recording unit 24.

For example, the generating unit 25 generates a combined image by carrying out the same procedure as that in step S19 in FIG. 13. At this point, for the pixels of the combined image corresponding to the pixels of the target channel in the region in which blending should be performed, the generating unit 25 performs a calculation according to the above described equation (1) based on the blend ratios, and sets the calculated pixel values as the pixel values of the pixels of the combined image.

After generating the combined image, the generating unit 25 supplies the generated combined image to the display control unit 26. The operation then moves on to step S64.

After a combined image is generated in step S63 or step S60, the procedures in steps S64 through S68 are carried out, and the displaying operation then comes to an end. Since those procedures are the same as the procedures in steps S20 through S24 in FIG. 13, explanation of them is not repeated herein.

In the above described manner, the display device 151 calculates viewed pixels and viewed positions in each block region based on the viewpoint position of the user, and allocates the parallax image for the right eye or the left eye to the pixels of each channel in the block regions based on the calculation result. A combined image is thus generated.

At this point, the display device 151 generates the pixels of the combined image corresponding to the pixels of the target channel by blending the right and left parallax images where necessary. As a result, crosstalk can be reduced, and images with higher quality can be presented.

Figure 23:
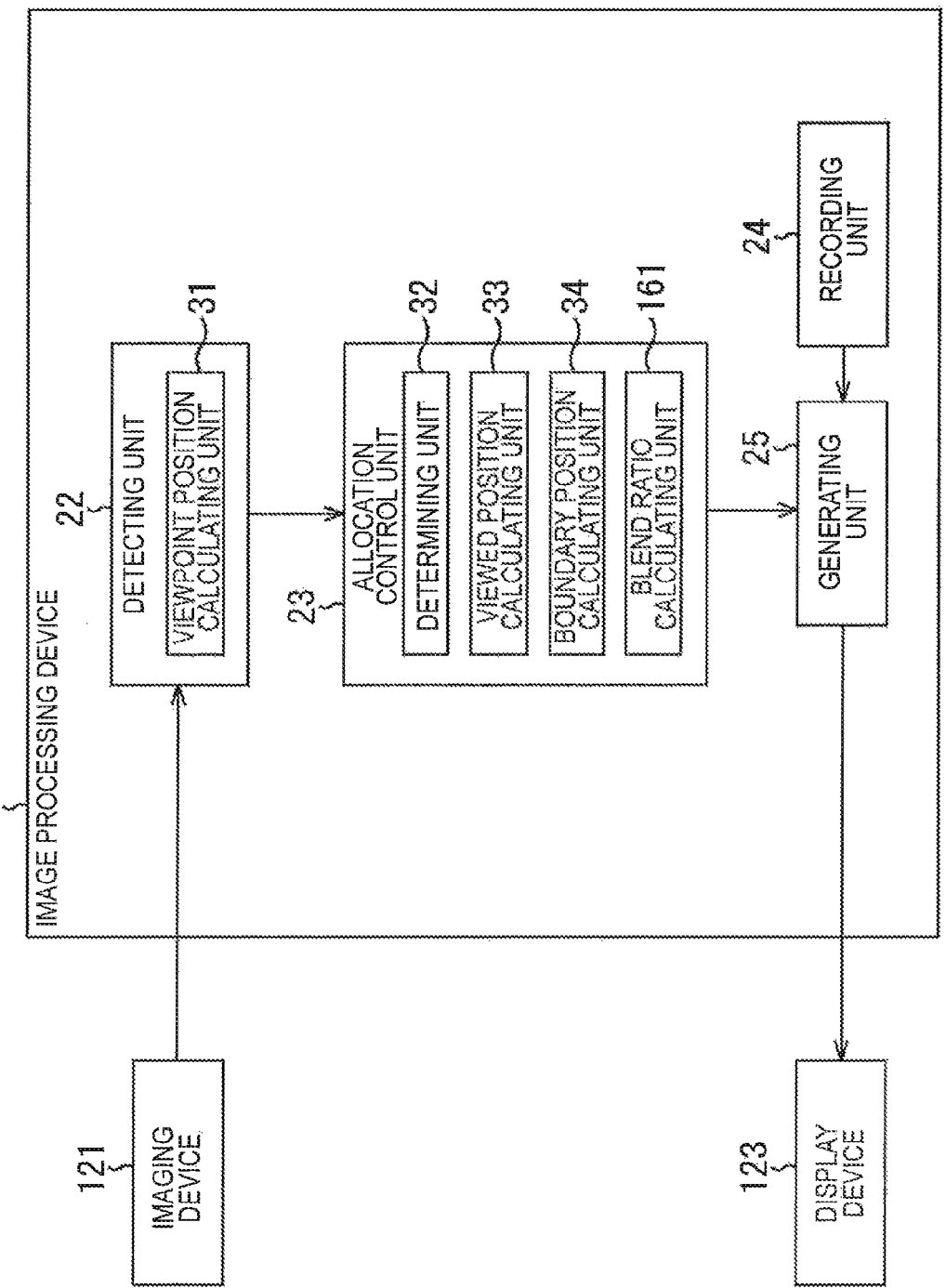
FIG. 23 is a diagram showing another example structure of a display system.

In a case where the above described blending operation is applied to the half-distance display method, the respective operations may be performed by the display system shown in FIG. 23. In FIG. 23, the components equivalent to the components shown in FIG. 15 or 20 are denoted by the same reference numerals as those used in FIG. 15 or 20, and explanation of them is not repeated herein.

The display system shown in FIG. 23 is formed with an imaging device 121, an image processing device 181, and a display device 123. The image processing device 181 is formed with a detecting unit 22, an allocation control unit 23, a recording unit 24, and a generating unit 25.

Here, the image processing device 181 has the same structure as the image processing device 122 shown in FIG. 15, except that a blend ratio calculating unit 161 is provided in the allocation control unit 23 of the image processing device 181. In the display system shown in FIG. 23, the same operation as the displaying operation shown in FIGS. 21 and 22 is performed.

The above described series of operations can be performed by hardware, and can also be performed by software. In a case where the series of operations are performed by software, the program of the software is installed from a program recording medium into a computer incorporated into special-purpose hardware or a general-purpose personal computer that can execute various kinds of functions by installing various kinds of programs, for example.

FIG. 24 is a block diagram showing an example structure of the hardware of a computer that performs the above described series of operations in accordance with the program.

In the computer, a CPU (Central Processing Unit) 201, a ROM (Read Only Memory) 202, and a RAM (Random Access Memory) 203 are connected to one another by a bus 204.

An input/output interface 205 is further connected to the bus 204. An input unit 206 formed with a keyboard, a mouse, a microphone, and the like, an output unit 207 formed with a display, a speaker, and the like, a recording unit 208 formed with a hard disk, a nonvolatile memory, or the like, a communication unit 209 formed with a network interface or the like, and a drive 210 that drives a removable medium 211 such as a magnetic disk, an optical disk, a magnetooptical disk, a semiconductor memory, or the like are connected to the input/output interface 205.

In the computer having the above described structure, the CPU 201 loads the program stored in the recording unit 208 into the RAM 203 via the input/output interface 205 and the bus 204, for example, and executes the program, so that the above described series of operations are performed.

The program to be executed by the computer (the CPU 201) may be recorded on the removable medium 211 that is a packaged medium formed with a magnetic disk (including a flexible disk), an optical disk (such as a CD-ROM (Compact Disc-Read Only Memory) or a DVD (Digital Versatile Disc)), a magnetooptical disk, a semiconductor memory, or the like, or may be provided via a wired or wireless transmission medium such as a local area network, the Internet, or digital satellite broadcasting.

The program can be installed into the recording unit 208 via the input/output interface 205 as the removable medium 211 is mounted on the drive 210. Alternatively, the program may be received by the communication unit 209 via a wired or wireless transmission medium, and be installed into the recording unit 208. Also, the program may be installed beforehand into the ROM 202 or the recording unit 208.

The program to be executed by the computer may be a program for performing operations in chronological order in accordance with the sequence described in this specification, or may be a program for performing operations in parallel or performing an operation when necessary, such as when there is a call.

It should be noted that embodiments of the present technique are not limited to the above described embodiments, and various modifications may be made to them without departing from the scope of the present technique.

Further, the present technique may be embodied in the following structures.

[1]

A display device including:

a display unit that has block regions each formed with pixels of three or more channels;

a separating unit that separates an image displayed on pixels of the respective channels in the block regions;

an allocation control unit that allocates one of parallax images to pixels of the respective channels in the block regions in accordance with a viewpoint position of a user viewing the display unit, one of the parallax images being displayed in a first region that is formed with pixels adjacent to one another in the block regions and is formed with pixels of two or more different channels, another one of the parallax images having a parallax with respect to the one of the parallax images being displayed in a second region different from the first region in the block regions; and a generating unit that generates a combined image by combining the parallax images in accordance with the allocation performed by the allocation control unit.

[2]

The display device of [1], wherein the parallax images are a parallax image for the right eye and a parallax image for the left eye.

[3]

The display device of [2], wherein, when the user views the display unit from a predetermined viewpoint position, pixels of the same channel in the respective block regions are viewed.

[4]

The display device of [3], wherein
the allocation control unit includes:
a viewed position calculating unit that determines a viewed position in a viewed pixel to be viewed by the user in each of the block regions based on the viewpoint position; and
a boundary position calculating unit that calculates a boundary position that is the position of the block region in which the viewed position is substantially the center of the viewed pixel, and allocates the same one of the parallax images to pixels of the same channel in each of the block regions located between the boundary position and another boundary position closest to the boundary position.

[5]

The display device of [4], wherein, in the block regions located between the boundary position and the other boundary position, the boundary position calculating unit allocates the same one of the parallax images to pixels of the same channel as the channel of the viewed pixel in the block region located in the boundary position and the channel of the viewed pixel in the block region located in the other boundary position.

[6]

The display device of [4] or [5], wherein the boundary position calculating unit sets an eventual boundary position that is the intermediate position between the boundary position calculated based on the right eye of the user and the boundary position calculated based on the left eye of the user.

[7]

The display device of [6], wherein
the allocation control unit further includes a blend ratio calculating unit that calculates a blend ratio for the respective pixels to be viewed with the right and left eyes of the user in a subject region between the boundary position calculated based on the right eye of the user and the boundary position calculated based on the left eye of the user, the blend ratio being calculated based on the positions of the pixels in the subject region, and the generating unit generates the pixels of the combined image to be displayed on the pixels to be viewed with the right and left eyes in the subject region, by blending the parallax image for the right eye and the parallax image for the left eye at the blend ratio.

[8]

The display device of any of [2] through [7], wherein, when the viewpoint position is located outside a predetermined region, the allocation control unit causes the display unit to display one of the parallax image for the right eye and the parallax image for the left eye.

REFERENCE SIGNS LIST

11 Display device, 21 Imaging unit, 22 Detecting unit, 23 Allocation control unit, 25 Generating unit, 26 Display control unit, 27 Display unit, 31 Viewpoint position calculating unit, 32 Determining unit, 33 Viewed position calculating unit, 34 Boundary position calculating unit, 81-1 through 81-3, 81 Opening portion, 161 Blend ratio calculating unit

The invention claimed is:

1. A display device comprising:
a display unit having a plurality of block regions each formed with pixels of three or more channels, wherein each pixel is one of: a red pixel, a green pixel, or a blue pixel, and each of the channels being associated with a respective parallax image;
a separating unit configured to separate an image displayed on pixels of the respective channels in the block regions, wherein each one of the plurality of block regions includes a viewing opening;
an allocation control unit configured to allocate one of parallax images to pixels of the respective channels in the block regions in accordance with a viewpoint position of a user viewing the display unit, one of the parallax images of a same viewpoint being displayed in a first region that is formed with pixels adjacent to one another in the block regions and is also formed with pixels of two or more different channels in a direction of parallax, another one of the parallax images having a parallax with respect to the one of the parallax images being displayed in a second region different from the first region in the block regions;
a viewed position calculating unit configured to determine a viewed position of a viewed pixel to be viewed by a user in each of the block regions based on the viewpoint position;
a boundary position calculating unit configured to calculate a boundary position that is a position of a block region in which the viewed position is substantially a center of the viewed pixel, and allocates the same one of the parallax images to pixels of the same channel in each of the block regions located between the boundary position and another boundary position closest to the boundary position; and
a generating unit configured to generate a combined image by combining the parallax images in accordance with the allocation performed by the allocation control unit,
wherein each of the block regions comprise at least one pair of adjacent channels that are associated with a same parallax image, and
wherein the display unit, the separating unit, the allocation control unit, the viewed position calculating unit, the boundary position calculating unit and the generating unit are each implemented via at least one processor.

2. The display device according to claim 1, wherein the parallax images are a parallax image for the right eye and a parallax image for the left eye.

3. The display device according to claim 2, wherein, when the user views the display unit from a predetermined viewpoint position, pixels of the same channel in the respective block regions are viewed.

4. The display device according to claim 1, wherein, in the block regions located between the boundary position and the another boundary position, the boundary position calculating unit allocates the same one of the parallax images to pixels of the same channel as the channel of the viewed pixel in the block region located in the boundary position and the channel of the viewed pixel in the block region located in the another boundary position.

5. The display device according to claim 4, wherein the boundary position calculating unit sets an eventual boundary position that is an intermediate position between the boundary position calculated based on the right eye of the user and the boundary position calculated based on the left eye of the user.

6. The display device according to claim 5, wherein
the allocation control unit further includes a blend ratio calculating unit configured to calculate a blend ratio for the respective pixels to be viewed with the right and left eyes of the user in a subject region between the boundary position calculated based on the right eye of the user and the boundary position calculated based on the left eye of the user, the blend ratio being calculated based on positions of pixels in the subject region, and
the generating unit generates pixels of the combined image to be displayed on pixels to be viewed with the right and left eyes in the subject region, by blending the parallax image for the right eye and the parallax image for the left eye at the blend ratio.

7. The display device according to claim 1, wherein, when the viewpoint position is located outside a predetermined region, the allocation control unit causes the display unit to display one of the parallax image for the right eye and the parallax image for the left eye.

8. The display device according to claim 1, wherein the channels are arranged in a direction of the parallax.

9. The display device according to claim 1, wherein the adjacent channels are arranged in a direction of the parallax.

10. The display device according to claim 1, wherein the separation unit provides a plurality of viewing openings.

11. The display device according to claim 1, wherein the viewed position calculating unit is further configured to calculate a viewing position for each of the plurality of viewing openings.

12. The display device according to claim 1, wherein the viewed position calculating unit is further configured to calculate a position of the viewed pixel through the viewing openings.

13. The display device according to claim 1, wherein the boundary position is a location of the block region having highest luminance of light from the viewed pixel to be viewed by the user.

14. A display method, the method being executed via at least one processor, and comprising:
forming a plurality of block regions each formed with pixels of three or more channels, wherein each pixel is one of: a red pixel, a green pixel, or a blue pixel, and each of the channels being associated with a respective parallax image;
separating, by a viewing opening for each of the plurality of block regions, an image displayed on pixels of the respective channels in the block regions;
allocating one of parallax images to pixels of the respective channels in the block regions in accordance with a viewpoint position of viewer viewing the display unit, one of the parallax images of a same viewpoint being displayed in a first region that is formed with pixels adjacent to one another in the block regions and is also formed with pixels of two or more different channels in a direction of parallax, another one of the parallax images having a parallax with respect to the one of the parallax images being displayed in a second region different from the first region in the block regions;
determining a viewed position of a viewed pixel to be viewed by a user in each of the block regions based on the viewpoint position;
calculating a boundary position that is a position of a block region in which the viewed position is substantially a center of the viewed pixel, and allocates the same one of the parallax images to pixels of the same channel in each of the block regions located between the boundary position and another boundary position closest to the boundary position; and
generating a combined image by combining the parallax images in accordance with the allocation performed by the allocation control unit,
wherein each of the block regions comprise at least one pair of adjacent channels that are associated with a same parallax image.

15. A non-transitory computer-readable storage medium having stored thereon a program, which when executed by a computer causes the computer to execute a method, the method comprising:
allocating one of parallax images to pixels of the respective channels in the block regions in accordance with a viewpoint position of a user viewing the display unit, wherein each pixel is one of: a red pixel, a green pixel, or a blue pixel, and each of the channels being associated with a respective parallax image, one of the parallax images of a same viewpoint being displayed in a first region that is formed with pixels adjacent to one another in the block regions and is also formed with pixels of two or more different channels in a direction of parallax, another one of the parallax images having a parallax with respect to the one of the parallax images being displayed in a second region different from the first region in the block regions;
determining a viewed position of a viewed pixel to be viewed by a user in each of the block regions based on the viewpoint position;
calculating a boundary position that is a position of a block region in which the viewed position is substantially a center of the viewed pixel, and allocates the same one of the parallax images to pixels of the same channel in each of the block regions located between the boundary position and another boundary position closest to the boundary position; and
generating a combined image by combining the parallax images in accordance with the allocation,
wherein each one of the plurality of block regions comprises a viewing opening for separating an image displayed on pixels of the respective channels in the block regions, and
wherein each of the block regions comprise at least one pair of adjacent channels that are associated with a same parallax image.

* * * * *